US011374694B2

(12) United States Patent
Nam et al.

(10) Patent No.: US 11,374,694 B2
(45) Date of Patent: Jun. 28, 2022

(54) TRANSPORT BLOCK SIZE INDICATION FOR RETRANSMISSIONS IN WIRELESS COMMUNICATIONS

(71) Applicant: QUALCOMM Incorporated, San Diego, CA (US)

(72) Inventors: Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/247,324

(22) Filed: Jan. 14, 2019

(65) Prior Publication Data

US 2019/0222360 A1 Jul. 18, 2019

Related U.S. Application Data

(60) Provisional application No. 62/618,518, filed on Jan. 17, 2018.

(51) Int. Cl.
*H04L 1/18* (2006.01)
*H04W 72/04* (2009.01)
(Continued)

(52) U.S. Cl.
CPC .......... *H04L 1/1812* (2013.01); *H04L 1/1835* (2013.01); *H04L 1/1864* (2013.01);
(Continued)

(58) Field of Classification Search
CPC ... H04L 1/1812; H04L 1/1835; H04L 1/1858; H04L 1/1864; H04W 28/06; H04W 72/0406; H04W 88/02; H04W 88/08
(Continued)

(56) References Cited

U.S. PATENT DOCUMENTS

2012/0057491 A1* 3/2012 Tiirola ................. H04B 7/0408
 370/252
2016/0037524 A1* 2/2016 Krzymien ............. H04L 1/1896
 370/329
(Continued)

FOREIGN PATENT DOCUMENTS

AU 2015231985 A1 10/2015
WO WO-2015072774 A1 5/2015

OTHER PUBLICATIONS

International Search Report and Written Opinion—PCT/US2019/013666—ISA/EPO—dated Apr. 24, 2019.
(Continued)

*Primary Examiner* — Melvin C Marcelo
(74) *Attorney, Agent, or Firm* — Holland & Hart LLP

(57) ABSTRACT

Methods, systems, and devices for wireless communications are described that provide for transport block size (TBS) determination for one or more wireless retransmissions of an initial transmission, in which the initial transmission may not be successfully received at a receiver. The receiver may determine, based on control information received in a retransmission, that the associated initial transmission was lost, and that the retransmission is not able to be decoded at the receiver. The receiver, in such cases, may provide a negative acknowledgment of the retransmission and an indication to the transmitter that the initial transmission was lost. The transmitter, responsive to the indication that the initial transmission was lost, may discontinue retransmitting the transmission, or may transmit additional control information for use in decoding the one or more retransmissions.

30 Claims, 22 Drawing Sheets

(51) Int. Cl.
  *H04W 28/06* (2009.01)
  *H04W 88/08* (2009.01)
  *H04W 88/02* (2009.01)

(52) U.S. Cl.
  CPC ....... *H04W 28/06* (2013.01); *H04W 72/0406* (2013.01); *H04L 1/1858* (2013.01); *H04W 88/02* (2013.01); *H04W 88/08* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2017/0105197 A1* | 4/2017 | Froberg | H04L 1/1812 |
| 2018/0092071 A1* | 3/2018 | Dinan | H04W 72/1289 |
| 2018/0110084 A1* | 4/2018 | Dinan | H04W 48/12 |
| 2018/0302191 A1* | 10/2018 | Park | H04L 1/1614 |

OTHER PUBLICATIONS

Panasonic: "CBG-based (Re)Transmission", 3GPP Draft; R1-1720499, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 17, 2017 (Nov. 17, 2017), 2 Pages, XP051369008, Retrieved from the Internet: URL: http://www.3gpp.org/ftp/tsg%5Fran/WG1%5FRL1/TSGR1%5F91/Docs/ [retrieved on Nov. 17, 2017] p. 1.

\* cited by examiner

TRANSPORT BLOCK SIZE INDICATION FOR RETRANSMISSIONS IN WIRELESS COMMUNICATIONS

CROSS REFERENCES

The present application for patent claims the benefit of U.S. Provisional Patent Application No. 62/618,518 by NAM, et al., entitled "TRANSPORT BLOCK SIZE INDICATION FOR RETRANSMISSIONS IN WIRELESS COMMUNICATIONS," filed Jan. 17, 2018, assigned to the assignee hereof, and expressly incorporated herein by reference in its entirety.

BACKGROUND

The following relates generally to wireless communication, and more specifically to transport block size (TBS) indication for retransmissions in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Base stations and UEs in wireless multiple-access communications systems may transmit a number of different uplink and downlink transmissions. Transmissions may be encoded according to modulation and coding scheme (MCS) into multiple transport blocks for transmission in an allocated number of wireless resource blocks by a transmitter. A TBS for encoding data into the multiple transport blocks may be determined based on one or more factors associated with the transmission, such as the MCS or number of resource blocks, for example. The TBS may be identified at a receiver and used for decoding the transmission. In some cases, the receiver may provide a feedback (e.g., hybrid automatic repeat request (HARD) acknowledgment/negative-acknowledgment (ACK/NACK) feedback) to the transmitter to indicate whether a transmission was successfully received at the transmitter. In the event that the transmitter receives feedback that a transmission was not successfully received or does not receive any feedback indication from the receiver, the transmitter may retransmit a transmission. Techniques for enhancing the efficiency of transmissions and retransmissions in such systems may be desirable in order to enhance overall system efficiency and enhance utilization of available wireless resources.

SUMMARY

The described techniques relate to improved methods, systems, devices, or apparatuses that support transport block size (TBS) indication for retransmissions in wireless communications. Various described techniques provide for an initial transmission, which may be lost and thus unsuccessfully received at a receiver, followed by one or more retransmissions of the initial transmission. In some cases, the one or more retransmissions may include only a subset of control information that is used for decoding the retransmissions. A receiver, such as a user equipment (UE) that receives only the one or more retransmissions may thus be unable to decode the one or more retransmissions. In some cases, the receiver may determine, based on control information received in a retransmission, that the associated initial transmission was lost, and that the retransmission is not able to be decoded at the receiver. The receiver, in such cases, may provide an indication to the transmitter that the initial transmission was lost. The transmitter, responsive to the indication that the initial transmission was lost, may discontinue retransmitting the transmission, or may transmit additional control information for use in decoding the one or more retransmissions.

A method of wireless communication is described. The method may include receiving, at a UE, first downlink control information (DCI) for a downlink retransmission from a base station, determining, based at least in part on information in the first DCI, that a prior DCI associated with the downlink retransmission from the base station to the UE was lost, and transmitting, responsive to the determining, a negative acknowledgment to the base station and an indication that the prior DCI was lost.

An apparatus for wireless communication is described. The apparatus may include means for receiving, at a UE, first DCI for a downlink retransmission from a base station, means for determining, based at least in part on information in the first DCI, that a prior DCI associated with the downlink retransmission from the base station to the UE was lost, and means for transmitting, responsive to the determining, a negative acknowledgment to the base station and an indication that the prior DCI was lost.

Another apparatus for wireless communication is described. The apparatus may include a processor, memory in electronic communication with the processor, and instructions stored in the memory. The instructions may be operable to cause the processor to receive, at a UE, first DCI for a downlink retransmission from a base station, determine, based at least in part on information in the first DCI, that a prior DCI associated with the downlink retransmission from the base station to the UE was lost, and transmit, responsive to the determining, a negative acknowledgment to the base station and an indication that the prior DCI was lost.

A non-transitory computer-readable medium for wireless communication is described. The non-transitory computer-readable medium may include instructions operable to cause a processor to receive, at a UE, first DCI for a downlink retransmission from a base station, determine, based at least in part on information in the first DCI, that a prior DCI associated with the downlink retransmission from the base station to the UE was lost, and transmit, responsive to the determining, a negative acknowledgment to the base station and an indication that the prior DCI was lost.

In some examples of the method, apparatus, and non-transitory computer-readable medium described above, the determining comprises determining that a TBS of the downlink retransmission may be unable to be derived from the first DCI. In some examples of the method, apparatus, and non-transitory computer-readable medium described above, the determining may be based at least in part on one or more of a new data indicator (NDI), an acknowledgment feedback process number, and a modulation and coding scheme (MCS) for the downlink retransmission in the first DCI.

In some examples of the method, apparatus, and non-transitory computer-readable medium described above, the transmitting comprises transmitting the negative acknowledgment and the indication that the prior DCI was lost in uplink control information (UCI) transmitted to the base station. In some examples of the method, apparatus, and non-transitory computer-readable medium described above, the UCI may be transmitted to the base station via a physical uplink control channel (PUCCH) transmission. Some examples of the method, apparatus, and non-transitory computer-readable medium described above may further include processes, features, means, or instructions for retransmitting the negative acknowledgment and the indication that the prior DCI was lost to the base station.

Some examples of the method, apparatus, and non-transitory computer-readable medium described above may further include processes, features, means, or instructions for buffering, at the UE, the downlink retransmission. Some examples of the method, apparatus, and non-transitory computer-readable medium described above may further include processes, features, means, or instructions for receiving, at the UE, a second DCI for a second downlink retransmission, the second DCI containing information for decoding the downlink retransmission and the second downlink retransmission. Some examples of the method, apparatus, and non-transitory computer-readable medium described above may further include processes, features, means, or instructions for combining, at the UE, the downlink retransmission and the second downlink retransmission. Some examples of the method, apparatus, and non-transitory computer-readable medium described above may further include processes, features, means, or instructions for decoding, at the UE, the combined downlink retransmissions.

Some examples of the method, apparatus, and non-transitory computer-readable medium described above may further include processes, features, means, or instructions for discarding the downlink retransmission from a buffer at the UE, based at least in part on determining that a prior DCI associated with the downlink retransmission from the base station to the UE was lost.

Some examples of the method, apparatus, and non-transitory computer-readable medium described above may further include processes, features, means, or instructions for buffering the downlink retransmission. Some examples of the method, apparatus, and non-transitory computer-readable medium described above may further include processes, features, means, or instructions for receiving a second DCI that contains information for decoding the downlink retransmission. Some examples of the method, apparatus, and non-transitory computer-readable medium described above may further include processes, features, means, or instructions for decoding the downlink retransmission based at least in part on the second DCI.

Some examples of the method, apparatus, and non-transitory computer-readable medium described above may further include processes, features, means, or instructions for receiving a third DCI associated with a second downlink retransmission. Some examples of the method, apparatus, and non-transitory computer-readable medium described above may further include processes, features, means, or instructions for buffering the second downlink retransmission. Some examples of the method, apparatus, and non-transitory computer-readable medium described above may further include processes, features, means, or instructions for combining the downlink retransmission and the second downlink retransmission. Some examples of the method, apparatus, and non-transitory computer-readable medium described above may further include processes, features, means, or instructions for decoding the combined downlink retransmissions based at least in part on information from the second DCI.

A method of wireless communication is described. The method may include transmitting, to a UE, first DCI and a first downlink transmission, the first DCI including information for decoding of the first downlink transmission at the UE, transmitting, to the UE, a second DCI and a first downlink retransmission of the first downlink transmission, wherein the second DCI includes a subset of the information for decoding the first downlink retransmission at the UE, and receiving, from the UE, a negative acknowledgment of the first downlink retransmission and an indication that the first DCI was lost.

An apparatus for wireless communication is described. The apparatus may include means for transmitting, to a UE, first DCI and a first downlink transmission, the first DCI including information for decoding of the first downlink transmission at the UE, means for transmitting, to the UE, a second DCI and a first downlink retransmission of the first downlink transmission, wherein the second DCI includes a subset of the information for decoding the first downlink retransmission at the UE, and means for receiving, from the UE, a negative acknowledgment of the first downlink retransmission and an indication that the first DCI was lost.

Another apparatus for wireless communication is described. The apparatus may include a processor, memory in electronic communication with the processor, and instructions stored in the memory. The instructions may be operable to cause the processor to transmit, to a UE, first DCI and a first downlink transmission, the first DCI including information for decoding of the first downlink transmission at the UE, transmit, to the UE, a second DCI and a first downlink retransmission of the first downlink transmission, wherein the second DCI includes a subset of the information for decoding the first downlink retransmission at the UE, and receive, from the UE, a negative acknowledgment of the first downlink retransmission and an indication that the first DCI was lost.

A non-transitory computer-readable medium for wireless communication is described. The non-transitory computer-readable medium may include instructions operable to cause a processor to transmit, to a UE, first DCI and a first downlink transmission, the first DCI including information for decoding of the first downlink transmission at the UE, transmit, to the UE, a second DCI and a first downlink retransmission of the first downlink transmission, wherein the second DCI includes a subset of the information for decoding the first downlink retransmission at the UE, and receive, from the UE, a negative acknowledgment of the first downlink retransmission and an indication that the first DCI was lost.

Some examples of the method, apparatus, and non-transitory computer-readable medium described above may further include processes, features, means, or instructions for transmitting, based at least in part on the receiving, a third DCI and a second downlink retransmission to the UE, the third DCI including information for decoding the first downlink retransmission and the second downlink retransmission at the UE.

Some examples of the method, apparatus, and non-transitory computer-readable medium described above may further include processes, features, means, or instructions for discontinuing further retransmissions of the first downlink transmission.

Some examples of the method, apparatus, and non-transitory computer-readable medium described above may further include processes, features, means, or instructions for transmitting, to the UE, a third DCI and a second downlink transmission, the third DCI including information for decoding of the second downlink transmission, and wherein the second downlink transmission contains information from the first downlink transmission and the third DCI and the second downlink transmission may be independent of the first DCI and the first downlink transmission.

Some examples of the method, apparatus, and non-transitory computer-readable medium described above may further include processes, features, means, or instructions for transmitting, based at least in part on the receiving, a third DCI including information for decoding the first downlink retransmission at the UE. Some examples of the method, apparatus, and non-transitory computer-readable medium described above may further include processes, features, means, or instructions for transmitting, to the UE, a fourth DCI and a second downlink retransmission, wherein the fourth DCI includes information that may be insufficient for decoding the first downlink retransmission and the second downlink retransmission at the UE. In some examples of the method, apparatus, and non-transitory computer-readable medium described above, the fourth DCI includes information that may be insufficient for decoding the first downlink retransmission and the second downlink retransmission at the UE.

In some examples of the method, apparatus, and non-transitory computer-readable medium described above, the negative acknowledgment and the indication that the first DCI was lost may be received in UCI. In some examples of the method, apparatus, and non-transitory computer-readable medium described above, the UCI may be received at via a PUCCH transmission.

DETAILED DESCRIPTION

Figure 1:
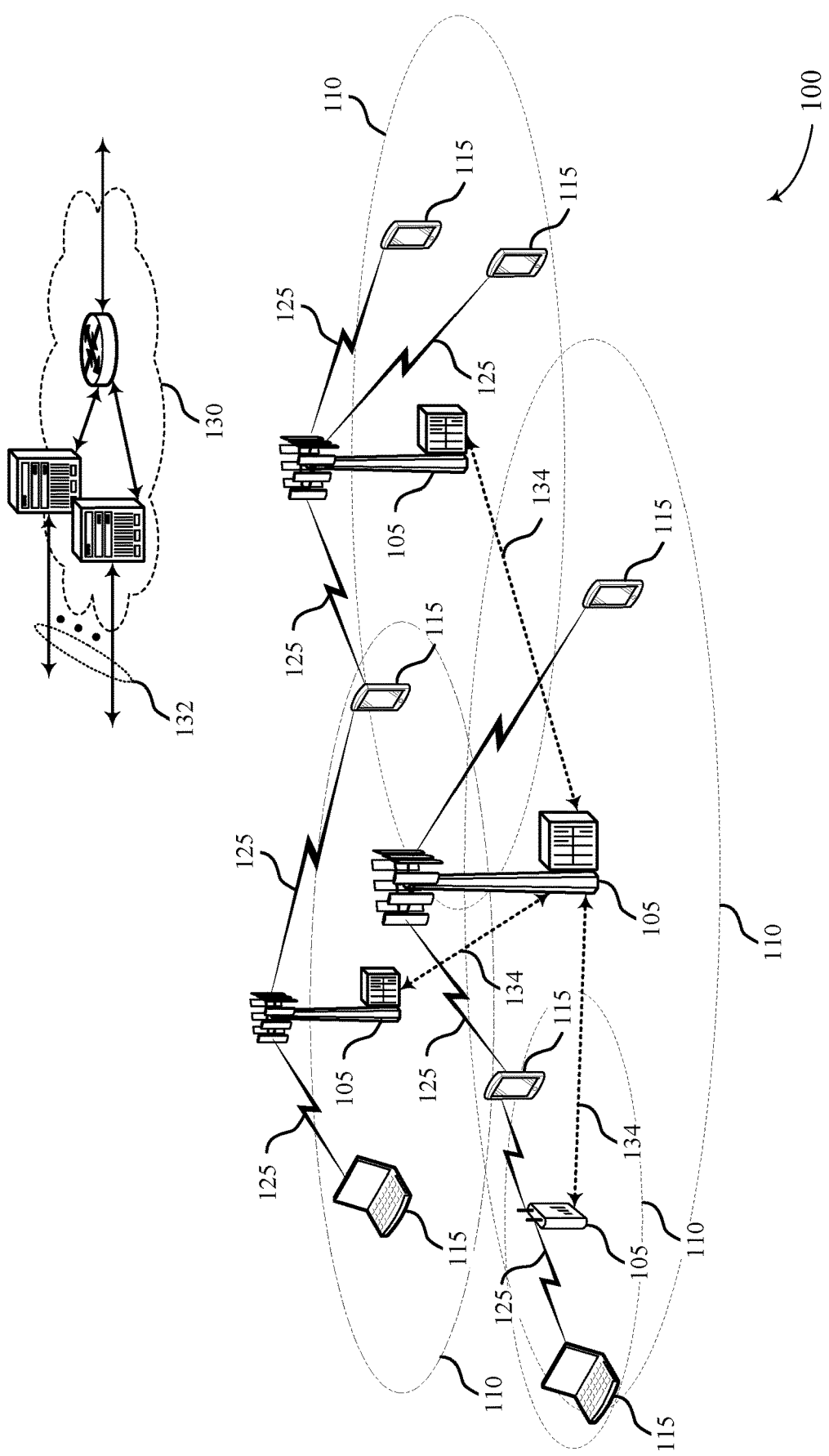
FIG. 1 illustrates an example of a system for wireless communication that supports transport block size indication for retransmissions in wireless communications in accordance with aspects of the present disclosure.

Various aspects of the present disclosure provide for efficient transmission and retransmissions of communications in which retransmissions may use a different control information than an initial transmission. In some cases, an initial transmission may have associated control information that may be used by a receiver to derive a transport block size (TBS) to be used for decoding of the transmission, and one or more retransmissions of the initial transmission may have a subset of the control information (e.g., on the assumption that the control information associated with the initial transmission is successfully received and some of the control information is still valid for the retransmissions, the retransmissions may have a subset of control information) for decoding of the transmission. In such cases, if the control information associated with the initial transmission is lost, the receiver may not be able to decode the one or more retransmissions. Such an initial transmission may be lost if, for example, interference or noise prevents the initial control information from being successfully received and decoded at the receiver, a signal strength of the initial transmission is insufficient to provide reliable receipt and decoding of the initial transmission, the initial transmission is received but not properly decoded at the receiver, receive chain electronics at the receiver are not configured to receive the initial transmission (e.g., due to being tuned to a different frequency band or being powered down), or any other situation in which a transmitter may transmit the initial transmission and the receiver does not successfully receive and decode the initial transmission.

In the event that the receiver determines that an initial transmission is lost and that a detected retransmission is unable to be decoded due to lack of sufficient control information, (e.g., to determine the TBS), the receiver may provide an indication to the transmitter that the initial transmission was lost. The transmitter, responsive to the indication that the initial transmission was lost, may discontinue retransmitting the transmission, or may transmit additional control information for use in decoding the one or more retransmissions. While various examples provided herein describe that a base station may transmit downlink transmissions and downlink retransmissions, and a receiver may attempt to receive the downlink transmissions and retransmissions, the techniques provided herein may be applied to other transmissions as well, such as uplink or sidelink transmissions, for example.

In some cases, a UE that determines that an initial transmission from a base station was lost may transmit a negative acknowledgment feedback (e.g., a hybrid automatic repeat request (HARQ) negative acknowledgment (NACK)) and an indication that the initial transmission was lost, upon determining that a downlink retransmission is unable to be decoded without control information from the initial transmission. In some cases, the NACK and indication may be transmitted in uplink control information (UCI) that is transmitted using a physical uplink control channel (PUCCH) transmission. The base station, upon receiving the NACK and indication that the initial transmission was lost may, in some cases, discontinue retransmissions. In such cases, the UE may disregard the received retransmission and await one or more further transmissions from the base station, which may include an independent transmission of the initial transmission. In other cases, the base station may transmit additional control information for use in decoding the one or more retransmissions. Such additional control information may be transmitted as stand-alone control information and the UE may buffer the downlink retransmission and use the control information to decode the buffered downlink retransmission. In some cases, the additional control information may be transmitted in conjunction with a second downlink retransmission, and the UE may buffer the downlink retransmission and combine the second downlink retransmission with the buffered downlink retransmission according to soft combining techniques, and attempt to decode the combined downlink retransmissions using the additional control information. In still other cases, stand-alone control information may be transmitted by the base station, followed by a second downlink retransmission, that may have additional control information, and that may be combined with one or more prior downlink retransmissions for soft combining and decoding at the UE.

Techniques as described herein may allow a base station to transmit initial downlink transmissions with a first set of downlink control information (DCI) that may be used to derive a TBS for the downlink transmission, and one or more subsequent downlink retransmissions with a subset of the DCI that may provide insufficient information to derive the TBS. A base station may thus have flexible scheduling for retransmissions, in which the downlink retransmission may use different modulation from the initial downlink transmission, different resource block (RB) or resource element (RE) allocations from the initial downlink transmission, or combinations thereof. In some cases, such as in some new radio (NR) systems, uplink and downlink resources available within a transmission time interval (TTI) may change between different TTIs, and scheduling flexibility to modify the DCI, modulation, RB/RE allocations, or combinations thereof may allow a base station to transmit one or more retransmissions using different allocations of downlink resources. In some cases, a base station may determine that an acknowledgment of an initial transmission has not been received, and may explicitly indicate all of the control information for decoding the retransmission in DCI for the retransmission, but in the event that sufficient wireless resources are unavailable for such explicit indication the base station may transmit the subset of DCI. The base station may then transmit the explicit DCI information in the event that the UE sends a negative acknowledgment and indication that the initial DCI was lost. In such cases, the UE may be configured to use soft combining of multiple transmissions, which may enhance the likelihood of successful reception at the UE.

Aspects of the disclosure are initially described in the context of a wireless communications system. Various examples of downlink transmissions, downlink retransmissions, and uplink transmissions are provided that show examples of techniques provided herein. Aspects of the disclosure are further illustrated by and described with reference to apparatus diagrams, system diagrams, and flowcharts that relate to TBS indication for retransmissions in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, base stations 105 and UEs 115 may transmit and receive transmissions and retransmissions in accordance with various techniques discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a base station 105 may transmit an initial downlink transmission with associated initial DCI, followed by one or more downlink retransmissions with associated retransmission DCI. In some cases, the retransmission DCI may provide insufficient information for a UE 115 to derive a TBS of the downlink retransmissions. In the event that the initial DCI is lost, a UE 115 that receives only the one or more retransmissions may thus be unable to decode the one or more retransmissions, and may determine that the corresponding initial DCI was lost. The UE 115, in such cases, may provide an indication to the base station that the initial transmission was lost, such as through transmission of a negative acknowledgment and an indication that the initial transmission was lost. The base station 105, responsive to the indication that the initial DCI was lost, may discontinue downlink retransmissions, or may transmit additional control information for use in decoding the one or more downlink retransmissions.

Figure 2:
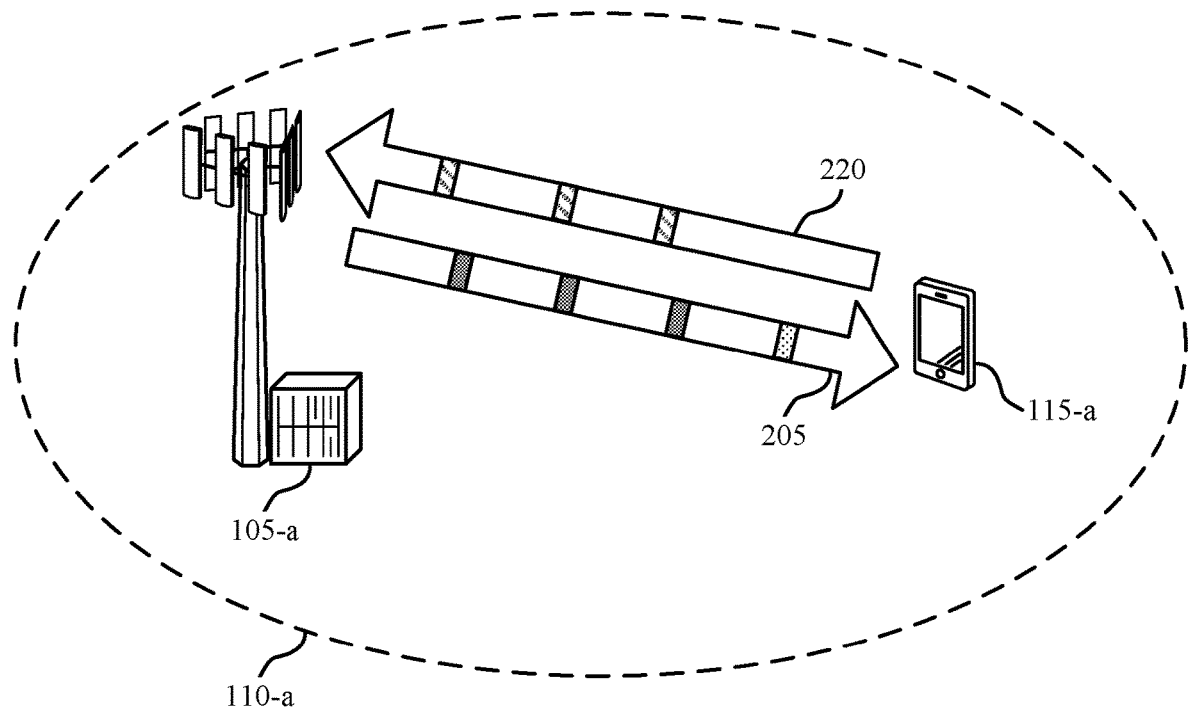
FIG. 2 illustrates an example of a portion of a wireless communication system that supports transport block size indication for retransmissions in wireless communications in accordance with aspects of the present disclosure.
Figure 2:
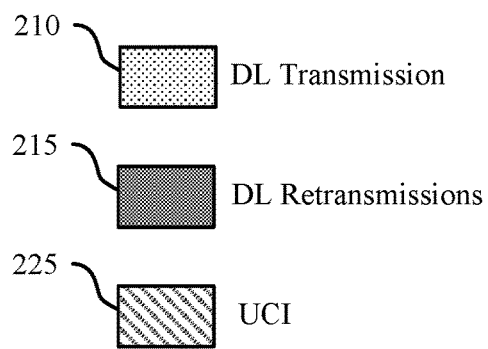

FIG. 2 illustrates an example of a wireless communication system 200 that supports transport block size indication for retransmissions in wireless communications in accordance with various aspects of the present disclosure. In some examples, wireless communication system 200 may implement aspects of wireless communication system 100. In the example of FIG. 2, the wireless communication system 200 may include a base station 105-a, which may be an example of a base station 105 of FIG. 1. The wireless communication system 200 may also include a UE 115-a, which may be an example of a UE 115 of FIG. 1, that is located within coverage area 110-a of the base station 105-a.

In some cases, the UE 115-a may fail to decode the scheduling DCI of the initial transmission. Additionally, the UE 115-a may not receive the initial transmission that was transmitted by the base station, and thus may not send any HARQ feedback. In some cases, the scheduler may detect this issue has occurred and the UE may receive a retransmission. The UE 115-a may not recognize whether this is an initial transmission or a retransmission as the transmission may contain the same or similar TBS, HARQ process number and NDI, although the RV may be different.

In some cases, TBS indication by DCI (e.g., MCS and $N_{RE}$) of the retransmission may not be possible or may be too restrictive. In this case, NR systems may be a better alternative due to the highly dynamic nature of the system and the flexible resource allocation. In some examples, the downlink and uplink duration and/or mini-slot duration may change between the initial transmission and the retransmission. Additionally, the overhead such as control resource set (CORESET) and channel state information resource set (CSI-RS), may be different between the initial transmission and the retransmission.

In the example of FIG. 2, the base station 105-a and the UE 115-a may establish a connection that supports downlink transmissions 205 and uplink transmissions 220. In some cases, the base station 105-a may transmit an initial downlink transmission 210, which may be followed by one or more downlink retransmissions 215. In some cases, the base station 105-a may transmit downlink retransmissions 215 based on lack of receipt of an acknowledgement of the initial downlink transmission 210, or based on receiving a negative acknowledgment (NACK) associated with the initial downlink transmission 210 that may be transmitted by the UE 115-a in UCI 225 that may be transmitted using a PUCCH transmission in uplink transmissions 220.

As indicated herein, in some cases, the base station 105-a may transmit DCI associated with each of the downlink transmissions, including initial DCI transmitted with the initial downlink transmission 210 and subsequent DCI transmitted with the downlink retransmissions 215. Furthermore, in some cases, subsequent DCI may include information insufficient for deriving a TBS of the downlink retransmissions 215. Such cases may occur, for example, in some NR systems in which TBS is not determined from a look-up table based on MCS and allocated RBs, but rather a TBS, code block size (CBS), and base graph (BG) of low density parity code (LDPC) selection may be jointly performed based on an actual number of available REs for a particular TTI compared with a number of reference number of REs. In some cases, the TBS may not be arbitrary, and may instead be based on one or more elements. In some cases, the TBS may be based on whether some entries of the look-up table are duplicated in which the total number of unique entries may be approximately 273, on whether the TBSs are byte-aligned, on whether some services have common payloads such as RRC signaling message and voice over internet protocol (VoIP), and on the QPP interleaver size constraint (⅓ Turbo coding for LTE).

As indicated above, a TBS used for downlink retransmissions 215 is the same as the TBS used for the initial downlink transmission 210, and a scheduler at the base station 105-a, when formatting retransmission DCI, may assume that the initial DCI for the initial downlink transmission 210 is successfully received at the UE 115-a and thus that the TBS can be derived based on the MCS and RB/RE allocation of the initial DCI. Since the TBS is already known, the downlink retransmissions 215 may use different modulation from the initial downlink transmission 210, and RB/RE allocation for retransmission can be arbitrary, and thus the scheduler at the base station 105-a may have flexibility in scheduling retransmissions. In some cases, a modulation order for the downlink retransmissions 215 may be indicated by reserved MCS indices in a look-up table (e.g., a number of MCS indices (e.g., three MCS indices) may be reserved for QPSK, 16QAM, 64QAM, and 256QAM in a look-up table). In some cases, if 256QAM is supported, four MCS indices may be reserved.

In some cases, the scheduler at the base station 105-a may not assume the successful reception of the DCI of the initial downlink transmission 210, and may provide retransmission DCI from which the TBS can be derived, or may provide retransmission DCI that explicitly indicates the TBS. In such cases, the same MCS and allocated number of RB/REs can be allocated for the downlink retransmissions 215. In some cases, different MCS and allocated number of RB/REs can be allocated for the downlink retransmissions 215, as long as the same TBS can be derived. Such DCI may allow the UE 115-a to derive the TBS and decode the downlink retransmissions irrespective of whether the initial DCI of the initial downlink transmission 210 was received, but provides less flexibility to the scheduler at the base station. In some aspects of techniques provided herein, the base station 105-a may assume that the UE 115-a received the initial DCI of the initial downlink transmission 210, and may provide mechanisms for the UE 115-a to indicate that the initial DCI was not successfully received in the event that the UE 115-a received DCI for a downlink retransmission 215 and determines that the initial DCI was lost. In such a manner, the base station 105-a may have flexibility in scheduling downlink transmissions 205 and may take appropriate corrective action in the event that the UE 115-a does not receive the initial DCI. Such techniques may provide flexibility in the event that available downlink resources for downlink retransmissions 215 may change, such as is illustrated in the example of FIG. 3.

Figure 3:
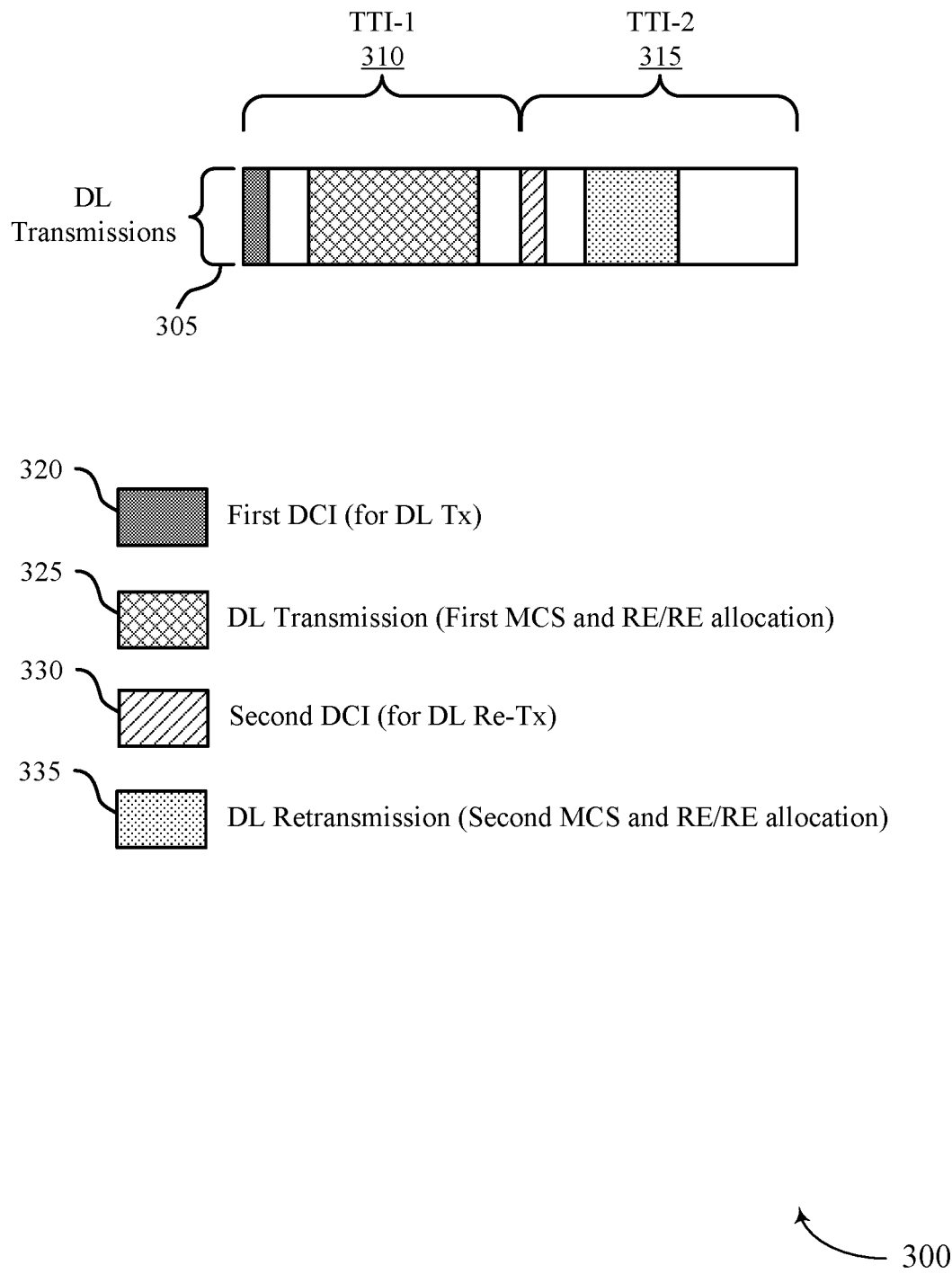
FIG. 3 illustrates an example of wireless resources that support transport block size indication for retransmissions in wireless communications in accordance with aspects of the present disclosure.

FIG. 3 illustrates an example of wireless resources 300 that support transport block size indication for retransmissions in wireless communications in accordance with various aspects of the present disclosure. In some examples, wireless resources 300 may implement aspects of wireless communication system 100 or 200. In the example of FIG. 3, downlink transmission 305 may be transmitted in multiple TTIs, including a first TTI 310 and a second TTI 315. In this example, the first TTI 310 may include first DCI 320, which may include MCS and RB/RE allocation information from which a TBS of a first downlink transmission 325 may be derived. The second TTI 315, may include second DCI 330 and a downlink retransmission 335 of the first downlink transmission 325. In this example, the second TTI 315 may have different available resources for downlink transmissions, and thus the second DCI 330 may indicate a different MCS and RB/RE allocation than the first DCI, while a TBS of the downlink retransmission 335 is the same as the TBS of the first downlink transmission 325. Thus, as indicated above, in some cases the second DCI 330 may include a subset of information needed for the UE to derive the TBS, as information from the first DCI 320 may also be needed to determine the TBS and decode information from the downlink retransmission 335. In this example, the first TTI 310 and the second TTI 315 are illustrated as being consecutive TTIs in time, but in other examples may be separated by one or more other intervening TTIs.

In some cases, the first DCI 320 may be lost and not successfully decoded at the UE. Furthermore, the UE in some cases, may not be aware that the first downlink transmission 325 was transmitted, and thus may not transmit an ACK/NACK feedback for the first downlink transmission 325. In some cases, a base station may detect this situation before TTI 315 and choose to transmit a downlink retransmission 335 with the same MCS and RB/RE allocations as the first downlink transmission 325, so that the TBS can be derived from the second DCI 330. Otherwise, in some cases, the second DCI 330 may include different MCS and RB/RE allocations from the first downlink transmission 325, as long as the same TBS as the first downlink transmission 325 can be derived. In cases where a wireless communication system, such as in some NR deployments, has highly dynamic and flexible resource allocation, such constraints may limit the flexibility of MCS and RB/RE allocations for retransmission. For example, in some NR systems, downlink and uplink duration, mini-slot duration, or combinations thereof may change between TTIs. Furthermore, in some NR systems, overhead, such as CORESET and CSI-RS, can be different between TTIs. Thus, in some cases, the base station may transmit the downlink retransmission 335 in the second TTI 315 with arbitrary MCS and RB/RE allocation, assuming TBS is already known to the UE, and in the event that the UE did not receive the first DCI 320 and thus does not know TBS, it may transmit an indication that the first DCI 320 was lost, in which case that base station may take appropriate corrective action, several examples of which are discussed in the examples of FIGS. 4 through 6

Figure 4:
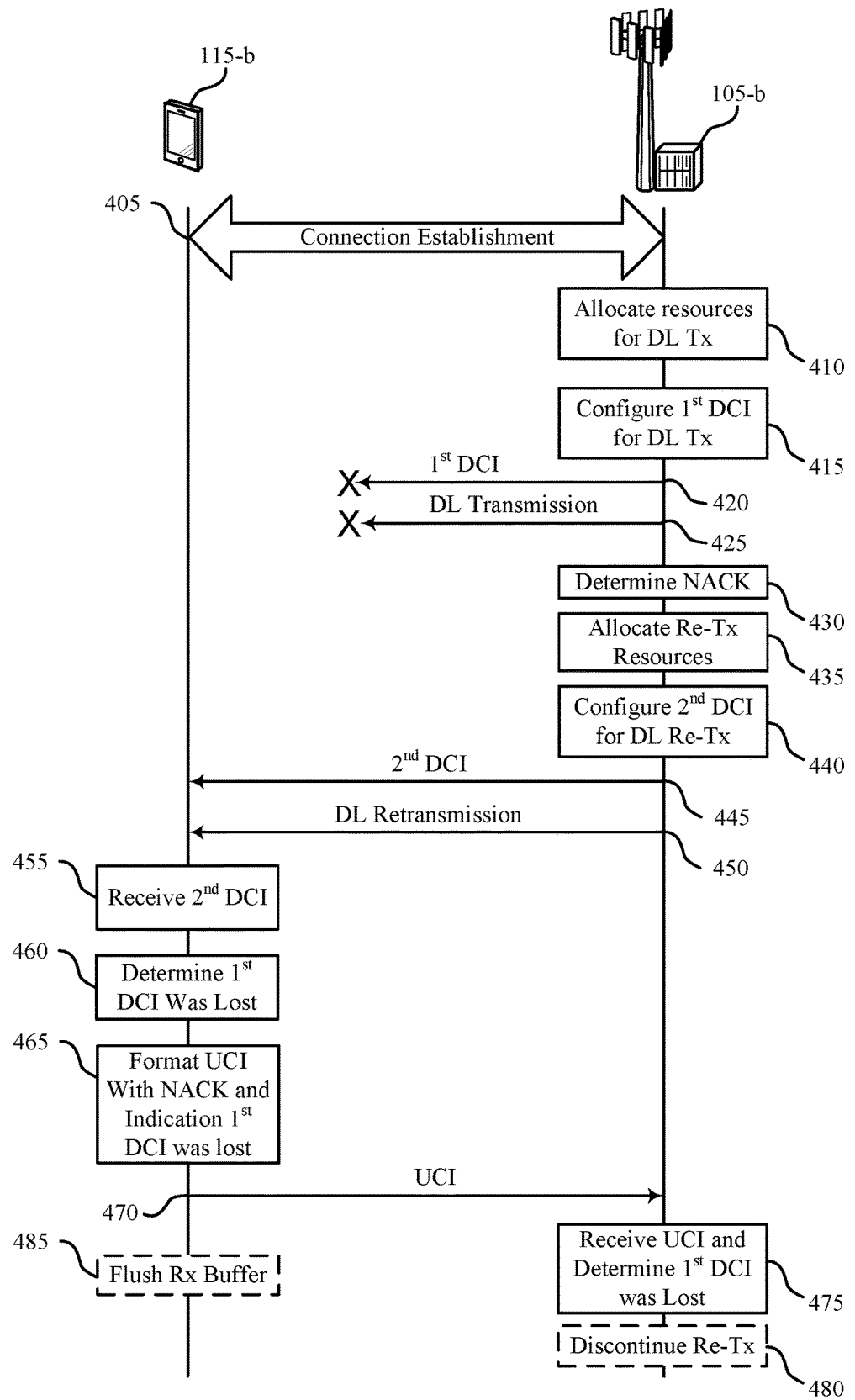
FIG. 4 illustrates an example of a process flow that supports transport block size indication for retransmissions in wireless communications in accordance with aspects of the present disclosure.

FIG. 4 illustrates an example of a process flow 400 that supports transport block size indication for retransmissions in wireless communications in accordance with various aspects of the present disclosure. In some examples, process flow 400 may be implemented in aspects of wireless communication system 100 or 200. The base station 105-b may be an example of a base station 105 of FIG. 1 or 2, and the UE 115-b may be an example of a UE 115 of FIG. 1 or 2. Initially, the base station 105-b and UE 115-b may establish a connection 405. Such a connection establishment may be performed using established connection establishment techniques.

At 410, the base station 105-b may allocate downlink resources for a downlink transmission to UE 115-b. The downlink resources may include resources within a TTI that are to be used for downlink transmissions. In some cases, the base station 105-*b* may allocate the downlink resources based on downlink data that is to be transmitted to the UE 115-*b* that may be present in a downlink transmission buffer for the UE 115-*b*.

At 415, the base station 105-*b* may configure a first DCI for the downlink transmission. The first DCI may include, for example, allocated resources (e.g., allocated RBs/REs within a TTI for downlink transmission to the UE 115-*b*), an MCS, a HARQ process number, a new data indicator (NDI), among others.

The base station 105-*b* may transmit the first DCI 420 and an associated first downlink transmission 425 to the UE 115-*b*. However, in this example, the UE 115-*b* may not successfully receive the first DCI 420 or the first downlink transmission 425. For example, interference, noise, or some other channel condition may prevent the UE 115-*b* from receiving and successfully decoding these downlink transmissions.

At 430, the base station 105-*b* may determine a negative acknowledgment (NACK) for the first downlink transmission 425. Such a NACK may be determined based on a lack of an acknowledgment (ACK) received from the UE 115-*b*.

At 435, the base station 105-*b* may allocate resources for retransmission of the first downlink transmission. In some cases, the resources for retransmission may be different than the resources that are available for the first downlink transmission 425. For example, available downlink resources for a TTI available for a retransmission may be different than the downlink resources of the TTI of the first downlink transmission 425.

At 440, the base station 105-*b* may configure a second DCI for the downlink retransmission. The second DCI may include similar information as the first DCI, such as allocated resources (e.g., allocated RBs/REs within a TTI for the downlink retransmission to the UE 115-*b*), an MCS, a HARQ process number, a NDI, among others. In some cases, the HARQ process number may be a same HARQ process number as the first DCI, and the NDI may indicate that the transmission is a retransmission (e.g., by not toggling the NDI and providing a same NDI as the initial transmission).

The base station 105-*b* may transmit the second DCI 445 and the downlink retransmission 450 to the UE 115-*b*. In this example, the UE 115-*b*, at 455, may receive the second DCI. The UE 115-*b* may decode the second DCI and identify the associated parameters, such as the allocated resources, MCS, HARQ process number, and NDI, for example.

At 460, the UE 115-*b* may determine that the first DCI was lost. In some cases, the UE 115-*b* may make such a determination based on the parameters from the second DCI. For example, the UE 115-*b* may determine that the NDI is toggled for the given HARQ process number, that an MCS index indicates a value reserved for retransmissions, or any combination thereof. In such a situation, the UE 115-*b* is not able to continue to decode the downlink retransmission 450, because the TBS for the downlink retransmission would need to be derived from the lost first DCI 420.

At 465, the UE 115-*b*, after making the determination that the first DCI was lost, may transmit a NACK to the base station 105-*b* along with an indication that the first DCI was lost. By providing the indication that the first DCI was lost, the UE 115-*b* can allow the base station 105-*b* to differentiate between unsuccessful decoding of the downlink retransmission 450 and the UE 115-*b* being unable to attempt decoding. The UE 115-*b* may transmit the NACK and indication using in a UCI transmission 470 (e.g., a via a PUCCH transmission). In some cases, the UE 115-*b* may transmit the UCI 470 multiple times, since it is also possible that the UCI 470 may be lost and not received by the base station 105-*b*. In some cases, a maximum number of retransmissions for the UCI 470 may be configured at the UE (e.g., via RRC signaling).

At 475, the base station 105-*b* may receive the UCI and determine that the first DCI 420 was lost. The base station 105-*b*, upon determining that the first DCI 420 was lost may take one of a number of different actions. In some cases, as illustrated at 480, the base station 105-*b* may optionally discontinue retransmitting the downlink transmission, and the UE 115-*b* at 485 may flush its receive buffer, and thus no further action is taken with respect to the first downlink transmission 425. In some cases, the base station 105-*b* may attempt another independent transmission of the data transmitted using the first downlink transmission 425. In other cases, as will be discussed in more detail with respect to FIGS. 5 and 6, the base station 105-*b* may transmit further DCI either alone or in conjunction with another retransmission. In some cases, the base station 105-*b* may configure the UE 115-*b* (e.g., as part of the connection establishment for connection 405 via RRC signaling) which action is to be taken upon detection that the first DCI 420 is lost.

Figure 5:
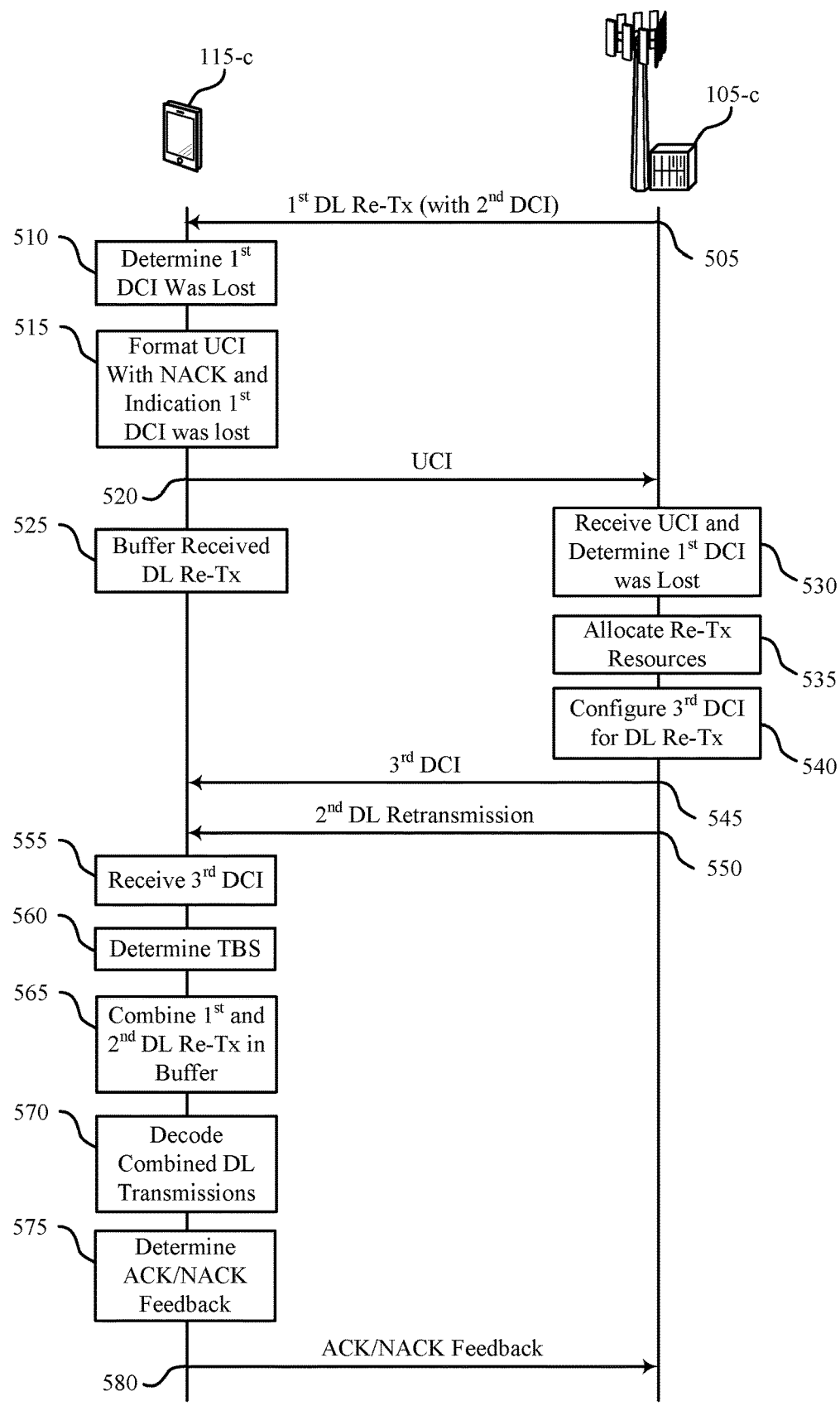
FIG. 5 illustrates an example of a process flow that supports transport block size indication for retransmissions in wireless communications in accordance with aspects of the present disclosure.

FIG. 5 illustrates an example of a process flow 500 that supports transport block size indication for retransmissions in wireless communications in accordance with various aspects of the present disclosure. In some examples, process flow 500 may be implemented in aspects of wireless communication system 100 or 200. The base station 105-*c* may be an example of a base station 105 of FIG. 1 or 2, and the UE 115-*c* may be an example of a UE 115 of FIG. 1 or 2. Initially, the base station 105-*c* and UE 115-*c* may establish a connection, and a first DCI and first downlink transmission may be transmitted by the base station 105-*c* and lost, such as discussed above with respect to FIG. 4.

At 505, following a determination at the base station 105-*c* that the first downlink transmission is to be retransmitted, the base station 105-*c* may transmit first downlink retransmission 505, which may have an associated second DCI. In this example, the UE 115-*c* may receive the second DCI. The UE 115-*c* may decode the second DCI and identify the associated parameters, such as the allocated resources, MCS, HARQ process number, and NDI, for example.

At 510, the UE 115-*c* may determine that the first DCI was lost. In some cases, the UE 115-*c* may make such a determination based on the parameters from the second DCI. For example, the UE 115-*c* may determine that the NDI is toggled for the given HARQ process number, that an MCS index indicates a value reserved for retransmissions, or any combination thereof. In such a situation, the UE 115-*c* is not able to continue to decode the downlink retransmission 505, because the TBS for the downlink retransmission would need to be derived from the lost first DCI.

At 515, the UE 115-*c*, after making the determination that the first DCI was lost, may format UCI with a NACK to the base station 105-*c* along with an indication that the first DCI was lost. By providing the indication that the first DCI was lost, the UE 115-*c* can allow the base station 105-*c* to differentiate between unsuccessful decoding of the downlink retransmission 505 and the UE 115-*c* being unable to attempt decoding. The UE 115-*c* may transmit the NACK and indication using in a UCI transmission 520 (e.g., a via a PUCCH transmission). In some cases, the UE 115-*c* may transmit the UCI 520 multiple times, as discussed above.

At 525, the UE 115-*c* may buffer the received downlink retransmission 505. In some cases, the UE 115-*c* may buffer the received downlink retransmission in a receive buffer for later decoding. In some cases, the receive buffer may be a soft combining buffer in which one or more subsequent retransmissions of the downlink transmission may be combined in order to enhance the likelihood of successful decoding of the downlink transmission.

At 530, the base station 105-c may receive the UCI 520 and determine that the first DCI was lost. In some cases, the base station 105-c may determine the first DCI was lost based on a NACK indication in the UCI plus the indication that the first DCI was lost at the UE 115-c.

At 535, the base station 105-c may allocate resources for a second downlink retransmission. In some cases, the resources for the second downlink retransmission may be different than the resources that are available for the first downlink retransmission 505. For example, available downlink resources for a TTI available for a retransmission may be different than the downlink resources of the TTI of the first downlink retransmission 505.

At 540, the base station 105-c may configure a third DCI for the second downlink retransmission. The third DCI may include similar information as the first DCI, such as allocated resources (e.g., allocated RBs/REs within a TTI for the downlink retransmission to the UE 115-b), an MCS, a HARQ process number, a NDI, among others. In some cases, the third DCI may include an explicit indication of the TBS for the downlink retransmissions, such as in an information element within the third DCI.

The base station 105-c may transmit the third DCI 545 and the second downlink retransmission 550 to the UE 115-c. In this example, the UE 115-c, at 555, may receive the third DCI. The UE 115-c may decode the third DCI and identify the associated parameters, such as the allocated resources, MCS, HARQ process number, and NDI, for example, and derive the TBS as indicated at 560.

At 565, the UE 115-c may combine the first downlink retransmission and the second downlink retransmission in the buffer. In some cases, the first downlink retransmission and the second downlink retransmission may be combined in a soft combining buffer according to soft combining techniques that may increase a likelihood that the UE 115-c can successfully decode the combined downlink retransmissions.

At 570, the UE 115-c may decode the combined downlink retransmissions. In some cases, the combined downlink transmissions may be decoded at a decoder based on the parameters from the third DCI and the determined TBS.

At 575, the UE 115-c may determine ACK/NACK feedback for the downlink retransmissions. In some cases, the UE 115-c may determine to acknowledge receipt of the downlink retransmissions based on successfully decoding the downlink retransmissions. In cases where the UE 115-c does not successfully decode the downlink retransmissions, the UE 115-c may determine to send a NACK feedback indication. The UE 115-c may then transmit ACK/NACK feedback 580 to the base station 105-c.

Figure 6:
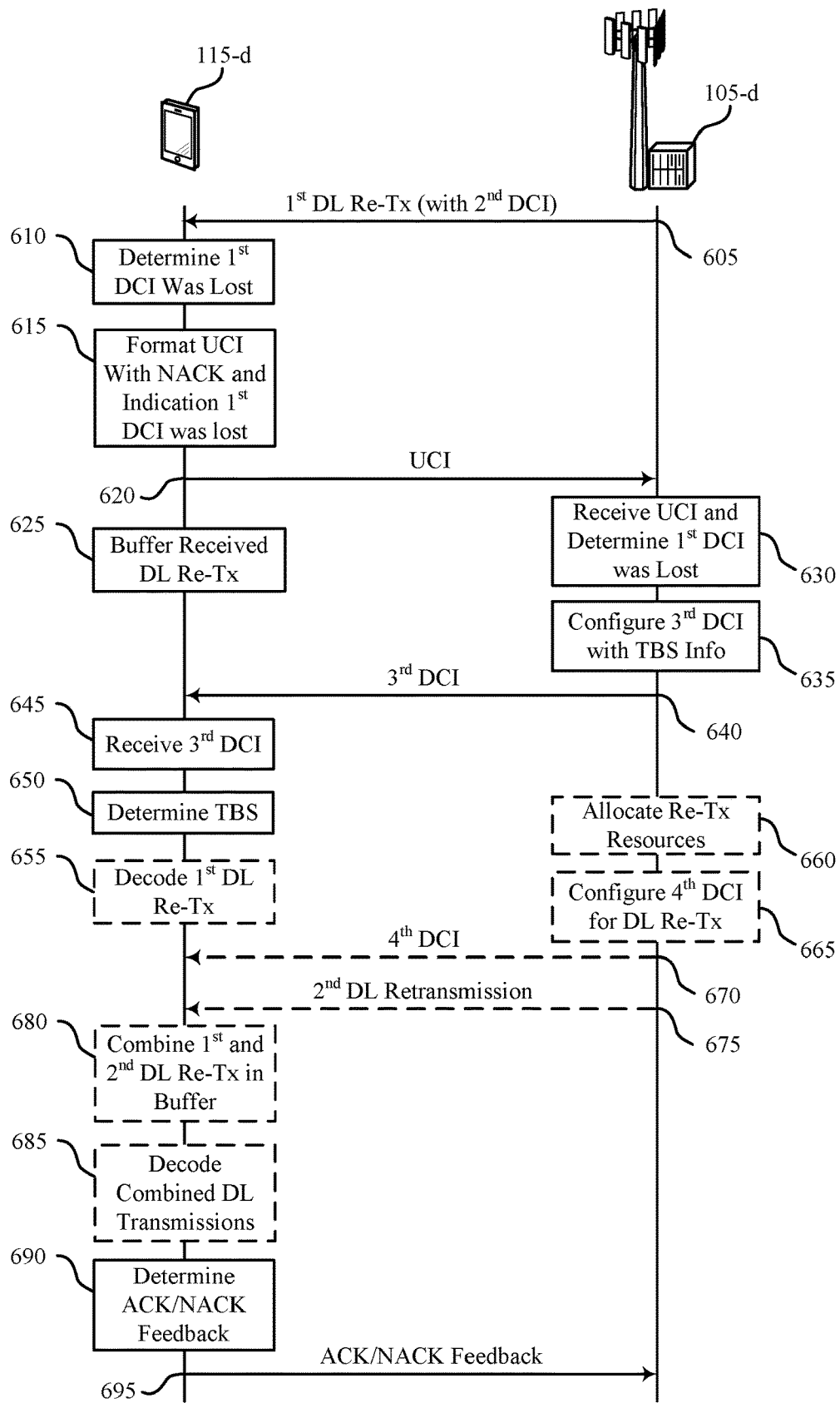
FIG. 6 illustrates an example of a process flow that supports transport block size indication for retransmissions in wireless communications in accordance with aspects of the present disclosure.

FIG. 6 illustrates an example of a process flow 600 that supports transport block size indication for retransmissions in wireless communications in accordance with various aspects of the present disclosure. In some examples, process flow 600 may be implemented in aspects of wireless communication system 100 or 200. The base station 105-d may be an example of a base station 105 of FIG. 1 or 2, and the UE 115-d may be an example of a UE 115 of FIG. 1 or 2. Initially, the base station 105-d and UE 115-d may establish a connection, and a first DCI and first downlink transmission may be transmitted by the base station 105-d and lost, such as discussed above with respect to FIG. 4.

At 605, following a determination at the base station 105-d that the first downlink transmission is to be retransmitted, the base station 105-d may transmit first downlink retransmission 605, which may have an associated second DCI. In this example, the UE 115-d may receive the second DCI. The UE 115-d may decode the second DCI and identify the associated parameters, such as the allocated resources, MCS, HARQ process number, and NDI, for example.

At 610, the UE 115-d may determine that the first DCI was lost. In some cases, the UE 115-d may make such a determination based on the parameters from the second DCI. For example, the UE 115-d may determine that the NDI is toggled for the given HARQ process number, that an MCS index indicates a value reserved for retransmissions, or any combination thereof. In such a situation, the UE 115-d is not able to continue to decode the downlink retransmission 605, because the TBS for the downlink retransmission would need to be derived from the lost first DCI.

At 615, the UE 115-d, after making the determination that the first DCI was lost, may format UCI with a NACK to the base station 105-d along with an indication that the first DCI was lost. By providing the indication that the first DCI was lost, the UE 115-d can allow the base station 105-d to differentiate between unsuccessful decoding of the downlink retransmission 605 and the UE 115-d being unable to attempt decoding. The UE 115-d may transmit the NACK and indication using in a UCI transmission 620 (e.g., a via a PUCCH transmission). In some cases, the UE 115-d may transmit the UCI 620 multiple times, as discussed above.

At 625, the UE 115-d may buffer the received downlink retransmission 605. In some cases, the UE 115-d may buffer the received downlink retransmission in a receive buffer for later decoding. In some cases, the receive buffer may be a soft combining buffer in which one or more subsequent retransmissions of the downlink transmission may be combined in order to enhance the likelihood of successful decoding of the downlink transmission.

At 630, the base station 105-d may receive the UCI 620 and determine that the first DCI was lost. In some cases, the base station 105-d may determine the first DCI was lost based on a NACK indication in the UCI plus the indication that the first DCI was lost at the UE 115-d.

At 635, the base station 105-d may configure a third DCI that indicates TBS information for the first downlink retransmission 605. The third DCI, in some cases, may include information that may be used to derive the TBS for the first downlink retransmission (e.g., MCS and allocated RBs/REs within a TTI for the downlink retransmission to the UE 115-b). In some cases, the third DCI may include an explicit indication of the TBS for the downlink retransmissions, such as in an information element within the third DCI.

The base station 105-d may transmit the third DCI 640 to the UE 115-d. In this example, the UE 115-d, at 645, may receive the third DCI. The UE 115-d may decode the third DCI and identify the TBS for the first downlink retransmission 605, as indicated at 650.

In some cases, the UE 115-d may be optionally configured to decode, at 655, the first downlink retransmission using the determined TBS. In such cases, the UE 115-d may determine ACK/NACK feedback at 690 and transmit the ACK/NACK feedback 695 to the base station 105-d.

In other cases, the UE 115-d may be optionally configured to receive another downlink retransmission and perform soft combining prior to decoding. In such cases, the base station 105-d, at 660 may allocate resources for a second downlink retransmission. In some cases, the resources for the second downlink retransmission may be different than the resources that are available for the first downlink retransmission 605. For example, available downlink resources for a TTI available for a retransmission may be different than the downlink resources of the TTI of the first downlink retransmission 605.

At 665, the base station 105-*d* may configure a fourth DCI for the second downlink retransmission. The fourth DCI may include similar information as the first or second DCI, such as allocated resources (e.g., allocated RBs/REs within a TTI for the downlink retransmission to the UE 115-*b*), an MCS, a HARQ process number, a NDI, among others. In some cases, the fourth DCI, by itself, may not be usable to derive the TBS of the downlink retransmissions.

The base station 105-*d* may transmit the fourth DCI 670 and the second downlink retransmission 675 to the UE 115-*d*. In this example, the UE 115-*d*, at 680, may receive the fourth DCI and combine the first downlink retransmission and the second downlink retransmission in the buffer. In some cases, the first downlink retransmission and the second downlink retransmission may be combined in a soft combining buffer according to soft combining techniques that may increase a likelihood that the UE 115-*d* can successfully decode the combined downlink retransmissions.

At 685, the UE 115-*d* may decode the combined downlink retransmissions. In some cases, the combined downlink transmissions may be decoded at a decoder based on the parameters from the third DCI and the determined TBS.

At 690, as discussed above, the UE 115-*d* may determine ACK/NACK feedback for the downlink retransmissions. In some cases, the UE 115-*d* may determine to acknowledge receipt of the downlink retransmissions based on successfully decoding the downlink retransmissions. In cases where the UE 115-*d* does not successfully decode the downlink retransmissions, the UE 115-*d* may determine to send a NACK feedback indication. The UE 115-*d* may then transmit ACK/NACK feedback 695 to the base station 105-*d*.

Figure 7:
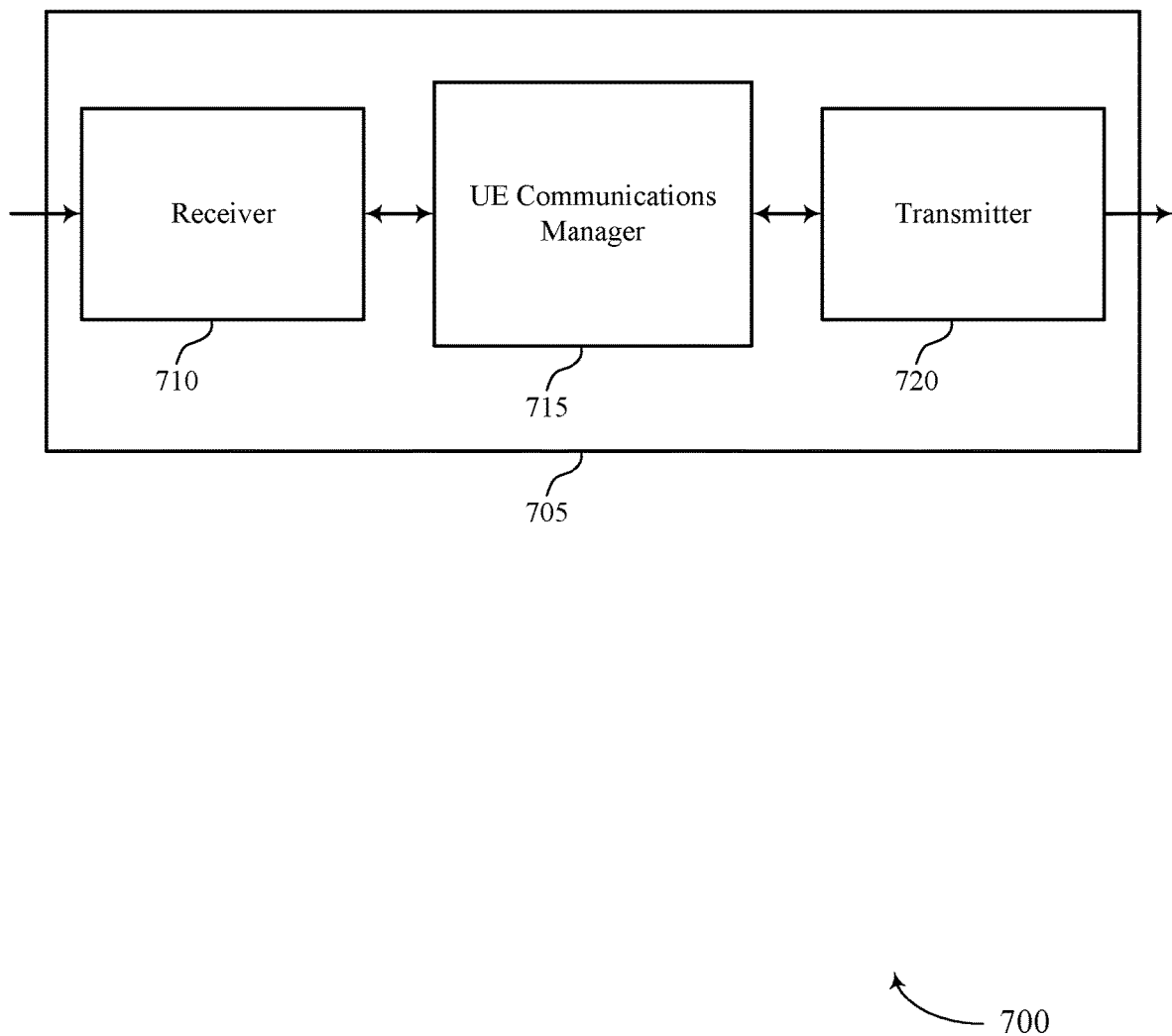
FIGS. 7 through 9 show block diagrams of a device that supports transport block size indication for retransmissions in wireless communications in accordance with aspects of the present disclosure.

FIG. 7 shows a block diagram 700 of a wireless device 705 that supports transport block size indication for retransmissions in wireless communications in accordance with aspects of the present disclosure. Wireless device 705 may be an example of aspects of a user equipment (UE) 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to TBS indication for retransmissions in wireless communications, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive, at a UE, first DCI for a downlink retransmission from a base station, determine, based on information in the first DCI, that a prior DCI associated with the downlink retransmission from the base station to the UE was lost, and transmit, responsive to the determining, a negative acknowledgment to the base station and an indication that the prior DCI was lost.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
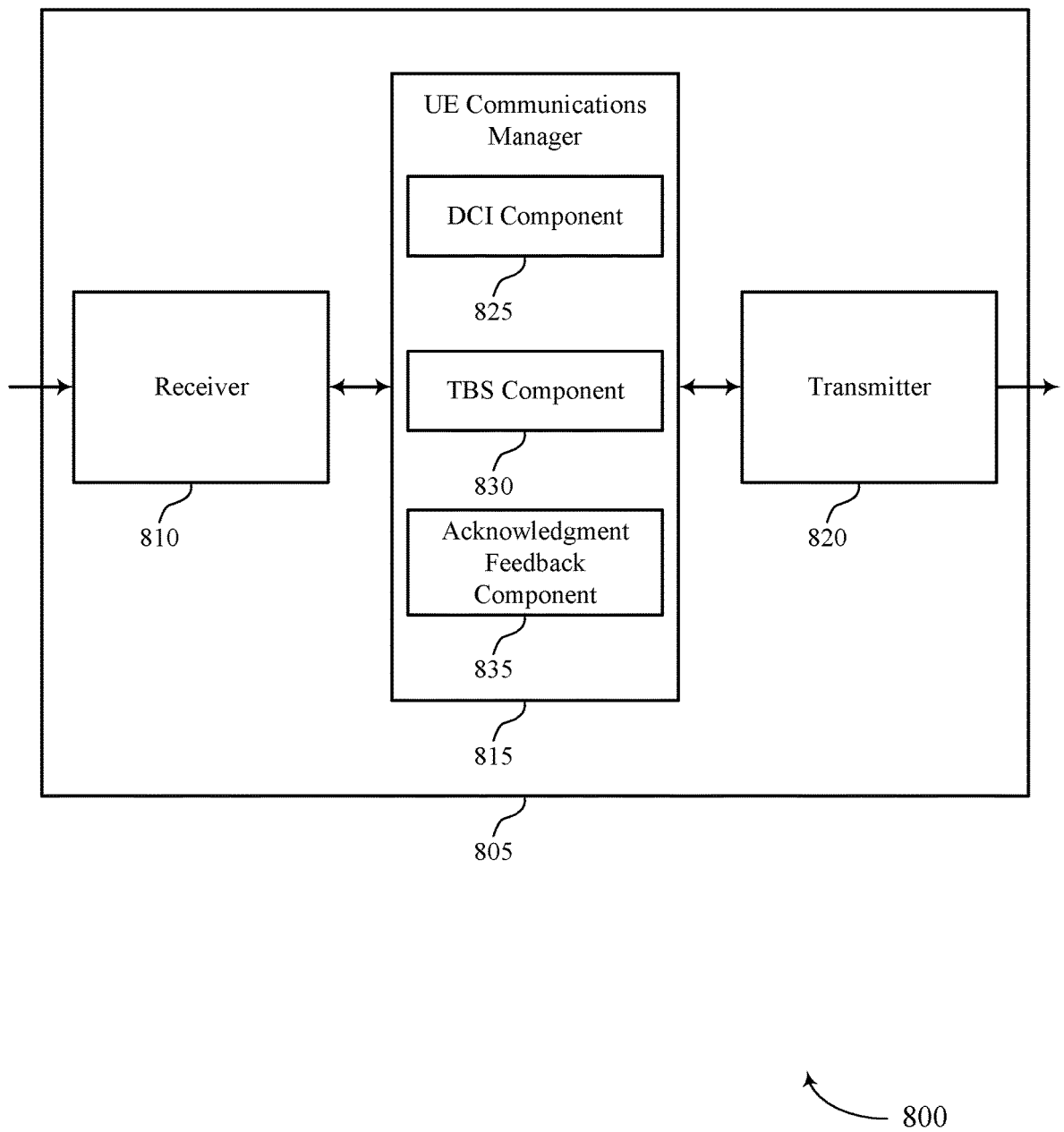

FIG. 8 shows a block diagram 800 of a wireless device 805 that supports transport block size indication for retransmissions in wireless communications in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to TBS indication for retransmissions in wireless communications, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include DCI component 825, TBS component 830, and acknowledgment feedback component 835.

DCI component 825 may receive first DCI for a downlink retransmission from a base station, receive a second DCI for a second downlink retransmission, the second DCI containing information for decoding the downlink retransmission. In some cases, DCI component 825 may receive a third DCI associated with a second downlink retransmission.

TBS component 830 may determine, based on information in the first DCI, that a prior DCI associated with the downlink retransmission from the base station to the UE was lost. In some cases, the determining includes determining that a TBS of the downlink retransmission is unable to be derived from the first DCI. In some cases, the determining is based on one or more of an NDI, an acknowledgment feedback process number, and an MCS for the downlink retransmission in the first DCI.

Acknowledgment feedback component 835 may transmit, responsive to the determining, a negative acknowledgment to the base station and an indication that the prior DCI was lost. In some cases, acknowledgment feedback component 835 may retransmit the negative acknowledgment and the indication that the prior DCI was lost to the base station. In some cases, a configured number of retransmissions of the negative acknowledgment and the indication that the prior DCI was lost are transmitted to the base station.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
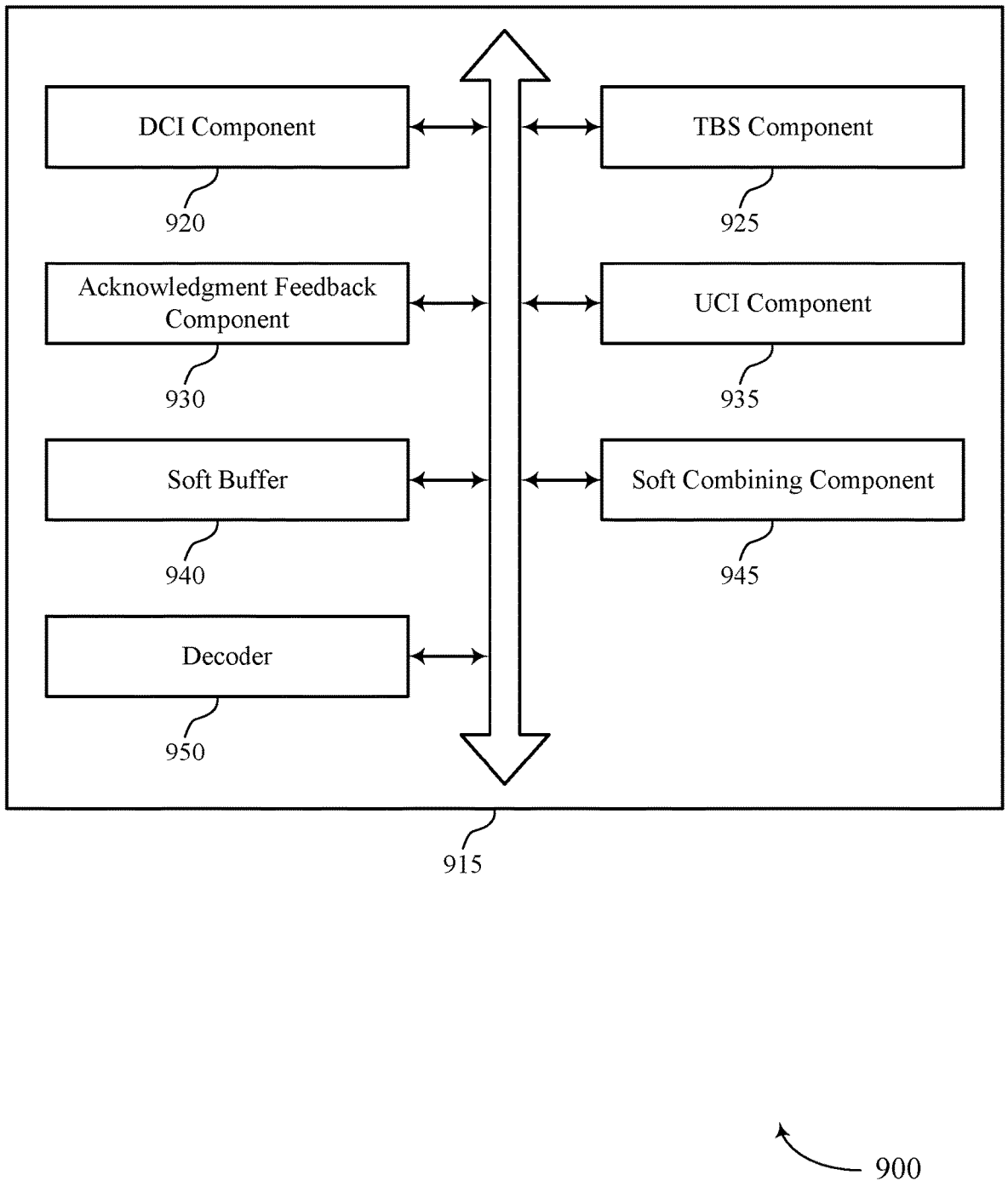

FIG. 9 shows a block diagram 900 of a UE communications manager 915 that supports transport block size indication for retransmissions in wireless communications in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include DCI component 920, TBS component 925, acknowledgment feedback component 930, UCI component 935, soft buffer 940, soft combining component 945, and decoder 950. Each of these modules may communicate, directly or indirectly, with one another (e.g., via one or more buses).

DCI component 920 may receive first DCI for a downlink retransmission from a base station, receive a second DCI for a second downlink retransmission, the second DCI containing information for decoding the downlink retransmission. In some cases, DCI component 920 may receive a third DCI associated with a second downlink retransmission.

TBS component 925 may determine, based on information in the first DCI, that a prior DCI associated with the downlink retransmission from the base station to the UE was lost. In some cases, the determining includes determining that a TBS of the downlink retransmission is unable to be derived from the first DCI. In some cases, the determining is based on one or more of an NDI, an acknowledgment feedback process number, and an MCS for the downlink retransmission in the first DCI.

Acknowledgment feedback component 930 may transmit, responsive to the determining, a negative acknowledgment to the base station and an indication that the prior DCI was lost. In some cases, acknowledgment feedback component 930 may retransmit the negative acknowledgment and the indication that the prior DCI was lost to the base station. In some cases, a configured number of retransmissions of the negative acknowledgment and the indication that the prior DCI was lost are transmitted to the base station.

UCI component 935 may configure UCI for transmission to a base station, such as via a PUCCH transmission. In some cases, the negative acknowledgment and the indication that the prior DCI was lost are transmitted in UCI transmitted to the base station. In some cases, the UCI is transmitted to the base station via a PUCCH transmission.

Soft buffer 940 may buffer the downlink retransmission, buffer the second downlink retransmission, for performance of soft combining of the buffered retransmissions. In some cases, soft buffer 940 may discard or flush a buffered downlink retransmission based on a determination that the downlink retransmission is not decodable at the UE. Soft combining component 945 may combine the buffered downlink retransmission and the second downlink retransmission.

Decoder 950 may decode the downlink retransmission, or decode the combined downlink retransmissions based on information from the second DCI.

Figure 10:
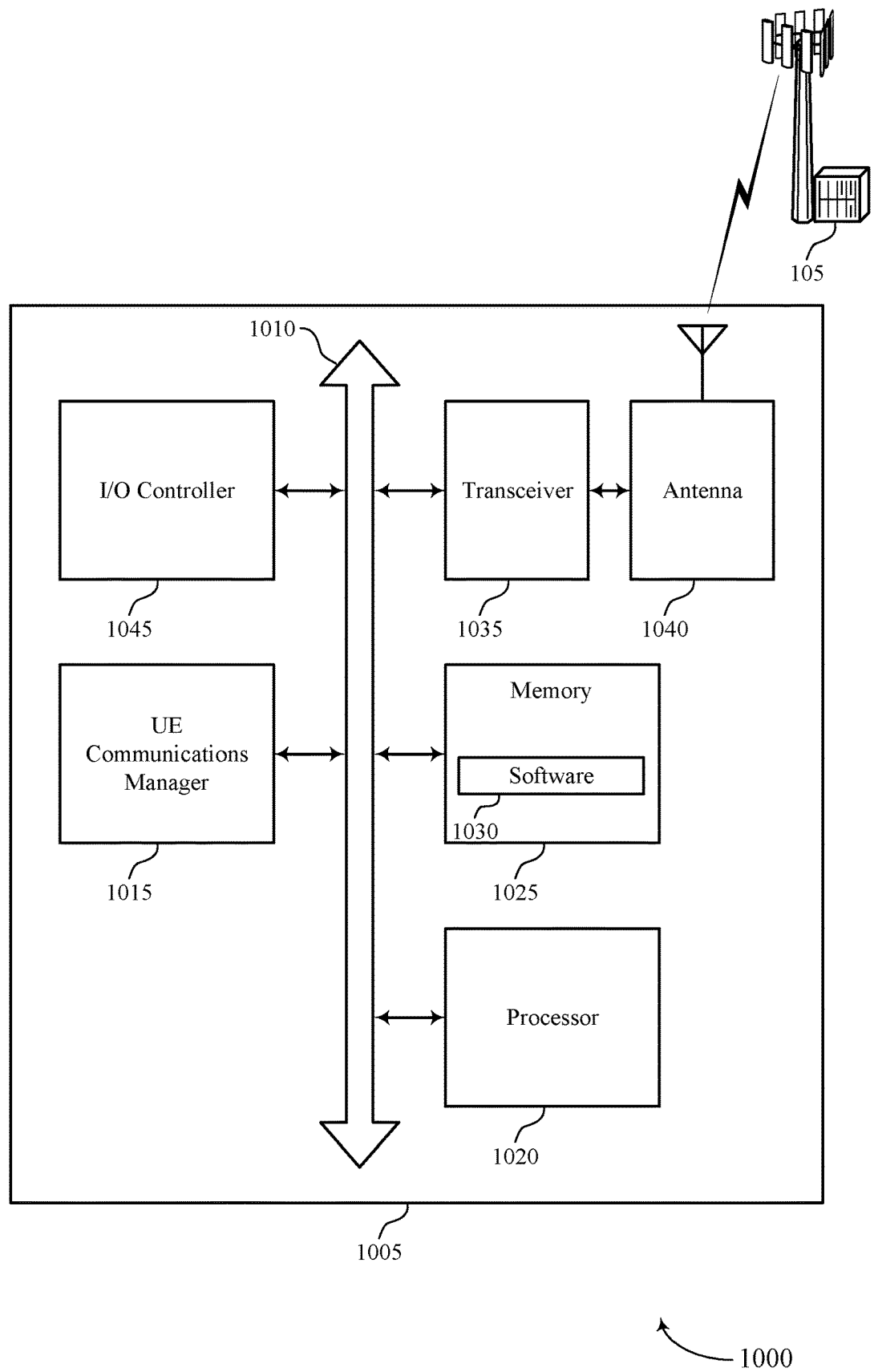
FIG. 10 illustrates a block diagram of a system including a UE that supports transport block size indication for retransmissions in wireless communications in accordance with aspects of the present disclosure.

FIG. 10 shows a diagram of a system 1000 including a device 1005 that supports transport block size indication for retransmissions in wireless communications in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting TBS indication for retransmissions in wireless communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support TBS indication for retransmissions in wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
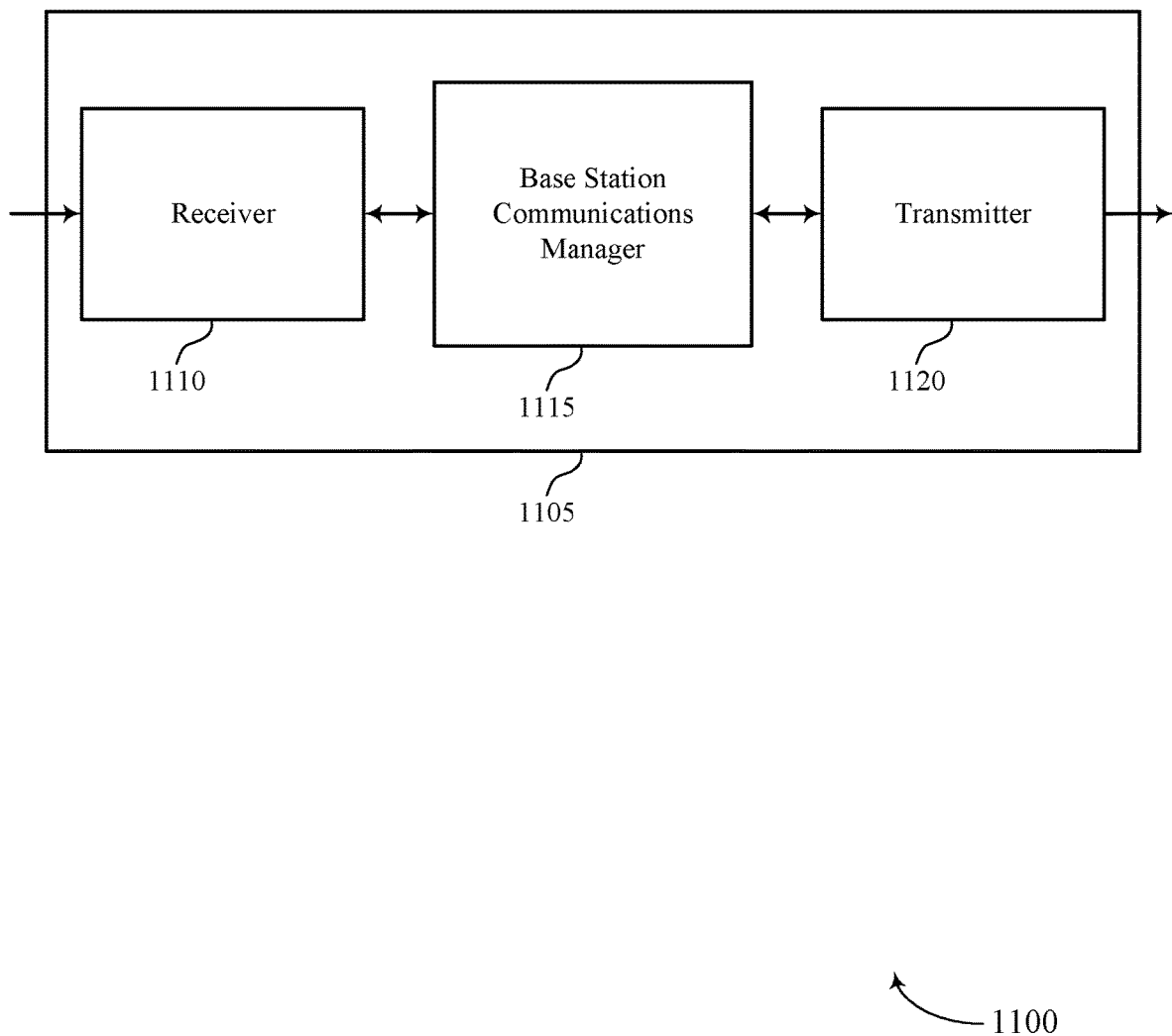
FIGS. 11 through 13 show block diagrams of a device that supports transport block size indication for retransmissions in wireless communications in accordance with aspects of the present disclosure.

FIG. 11 shows a block diagram 1100 of a wireless device 1105 that supports transport block size indication for retransmissions in wireless communications in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to TBS indication for retransmissions in wireless communications, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit, to a UE, first DCI and a first downlink transmission, the first DCI including information for decoding of the first downlink transmission at the UE, transmit, to the UE, a second DCI and a first downlink retransmission of the first downlink transmission, where the second DCI includes a subset of the information for decoding the first downlink retransmission at the UE, and receive, from the UE, a negative acknowledgment of the first downlink retransmission and an indication that the first DCI was lost.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
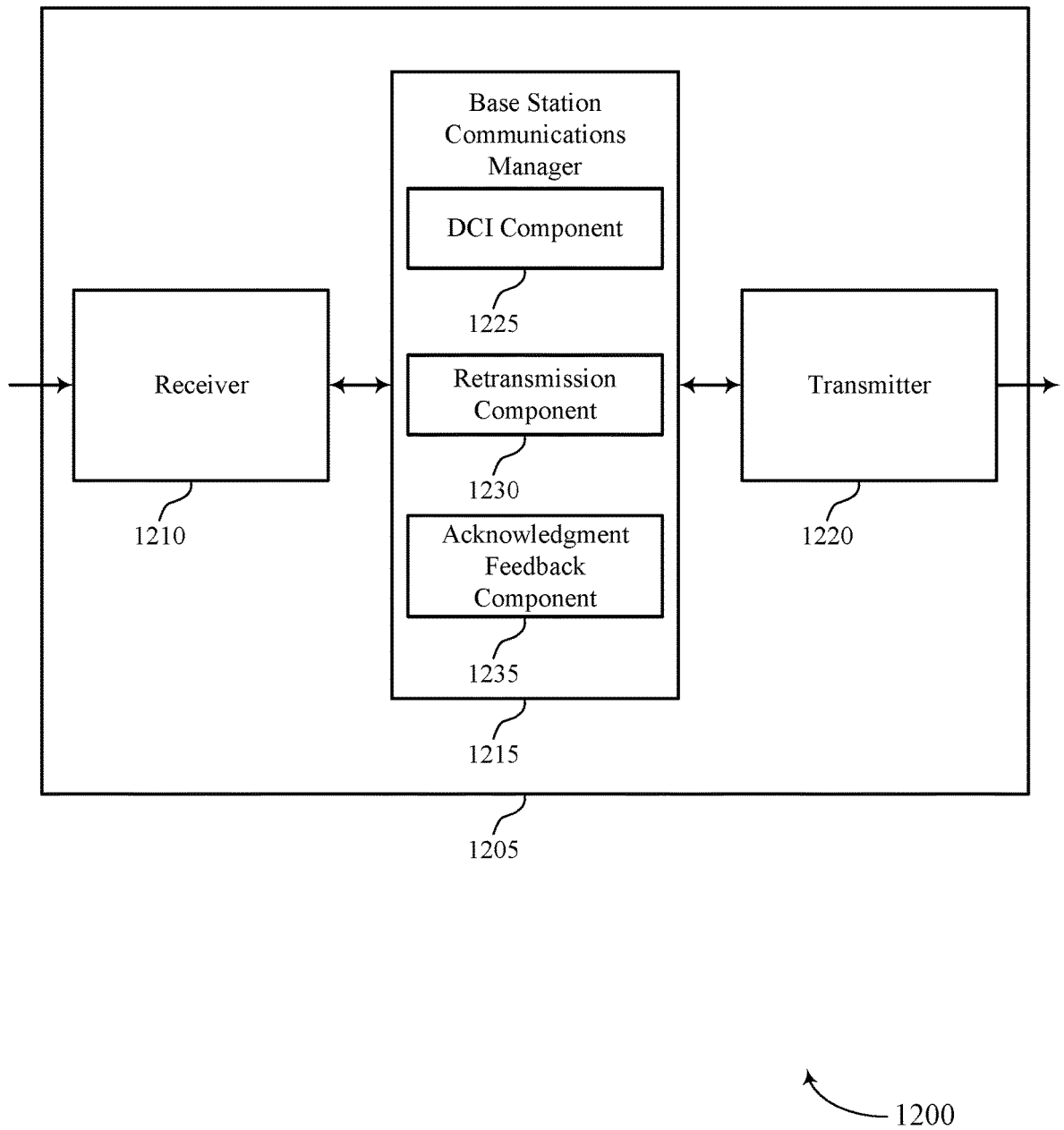

FIG. 12 shows a block diagram 1200 of a wireless device 1205 that supports transport block size indication for retransmissions in wireless communications in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to TBS indication for retransmissions in wireless communications, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14. Base station communications manager 1215 may also include DCI component 1225, retransmission component 1230, and acknowledgment feedback component 1235.

DCI component 1225 may transmit, to a UE, first DCI and a first downlink transmission, the first DCI including information for decoding of the first downlink transmission at the UE. The DCI component 1225 may also configure a second DCI for a first downlink retransmission. In cases where the base station receives a NACK and indication that the first downlink transmission is not received at the UE, the DCI component 1225 may transmit, based on receiving the NACK and indication, a third DCI and a second downlink retransmission to the UE, the third DCI including information for decoding the first downlink retransmission and the second downlink retransmission at the UE.

Retransmission component 1230 may transmit, to the UE, the second DCI and a first downlink retransmission of the first downlink transmission, where the second DCI includes a subset of the information for decoding the first downlink retransmission at the UE. In cases where the base station receives a NACK and indication that the first downlink transmission is not received at the UE, retransmission component 1230 may discontinue further retransmissions of the first downlink transmission. In some cases, retransmission component 1230 may transmit, to the UE, a third DCI and a second downlink transmission, the third DCI including information for decoding of the second downlink transmission, and where the second downlink transmission contains information from the first downlink transmission. In some cases, retransmission component 1230 may transmit, to the UE, a fourth DCI and a second downlink retransmission, where the fourth DCI includes information that is insufficient for decoding the first downlink retransmission and the second downlink retransmission at the UE.

Acknowledgment feedback component 1235 may receive, from the UE, a negative acknowledgment of the first downlink retransmission and an indication that the first DCI was lost.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
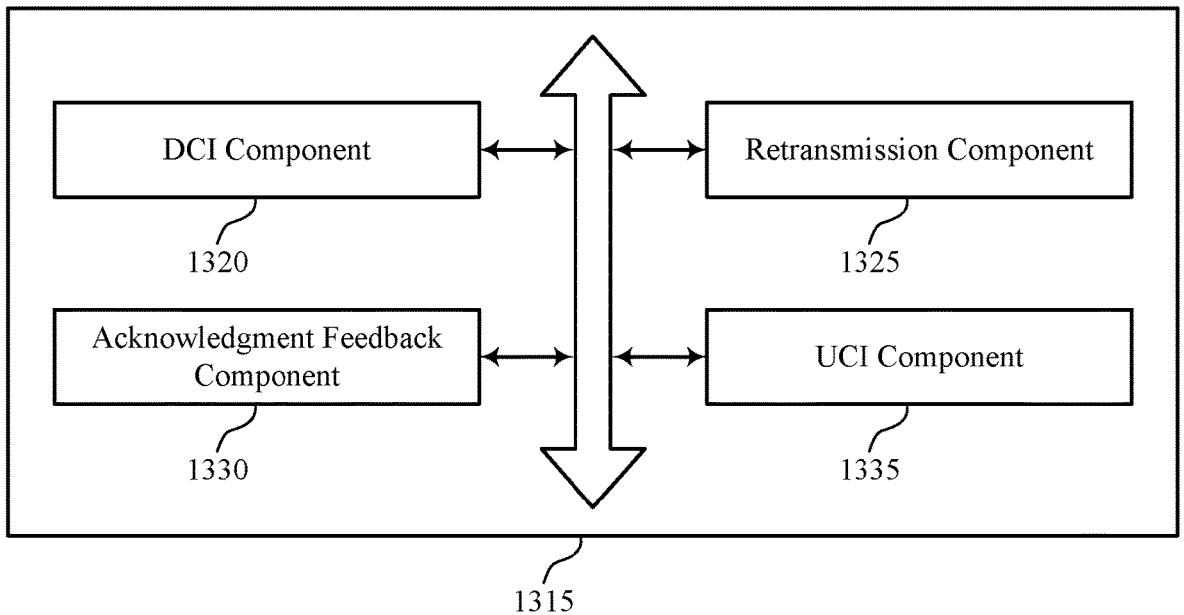

FIG. 13 shows a block diagram 1300 of a base station communications manager 1315 that supports transport block size indication for retransmissions in wireless communications in accordance with aspects of the present disclosure. The base station communications manager 1315 may be an example of aspects of a base station communications manager 1415 described with reference to FIGS. 11, 12, and 14. The base station communications manager 1315 may include DCI component 1320, retransmission component 1325, acknowledgment feedback component 1330, and UCI component 1335. Each of these modules may communicate, directly or indirectly, with one another (e.g., via one or more buses).

DCI component 1320 may transmit, to a UE, first DCI and a first downlink transmission, the first DCI including information for decoding of the first downlink transmission at the UE. The DCI component 1320 may also configure and transmit a second DCI for a first downlink retransmission. In cases where the base station receives a NACK and indication that the first downlink transmission is not received at the UE, the DCI component 1320 may transmit, based on receiving the NACK and indication, a third DCI and a second downlink retransmission to the UE, the third DCI including information for decoding the first downlink retransmission and the second downlink retransmission at the UE.

Retransmission component 1325 may transmit, to the UE, the second DCI and a first downlink retransmission of the first downlink transmission, where the second DCI includes a subset of the information for decoding the first downlink retransmission at the UE. In cases where the base station receives a NACK and indication that the first downlink transmission is not received at the UE, retransmission component 1325 may discontinue further retransmissions of the first downlink transmission. In some cases, retransmission component 1325 may transmit, to the UE, a third DCI and a second downlink transmission, the third DCI including information for decoding of the second downlink transmission, and where the second downlink transmission contains information from the first downlink transmission. In some cases, retransmission component 1325 may transmit, to the UE, a fourth DCI and a second downlink retransmission, where the fourth DCI includes information that is insufficient for decoding the first downlink retransmission and the second downlink retransmission at the UE.

Acknowledgment feedback component 1330 may receive, from the UE, a negative acknowledgment of the first downlink retransmission and an indication that the first DCI was lost.

UCI component 1335 may receive UCI from a UE, which may include acknowledgment feedback. In some cases, the negative acknowledgment and the indication that the first DCI was lost is received in UCI. In some cases, the UCI is received at via a PUCCH transmission.

Figure 14:
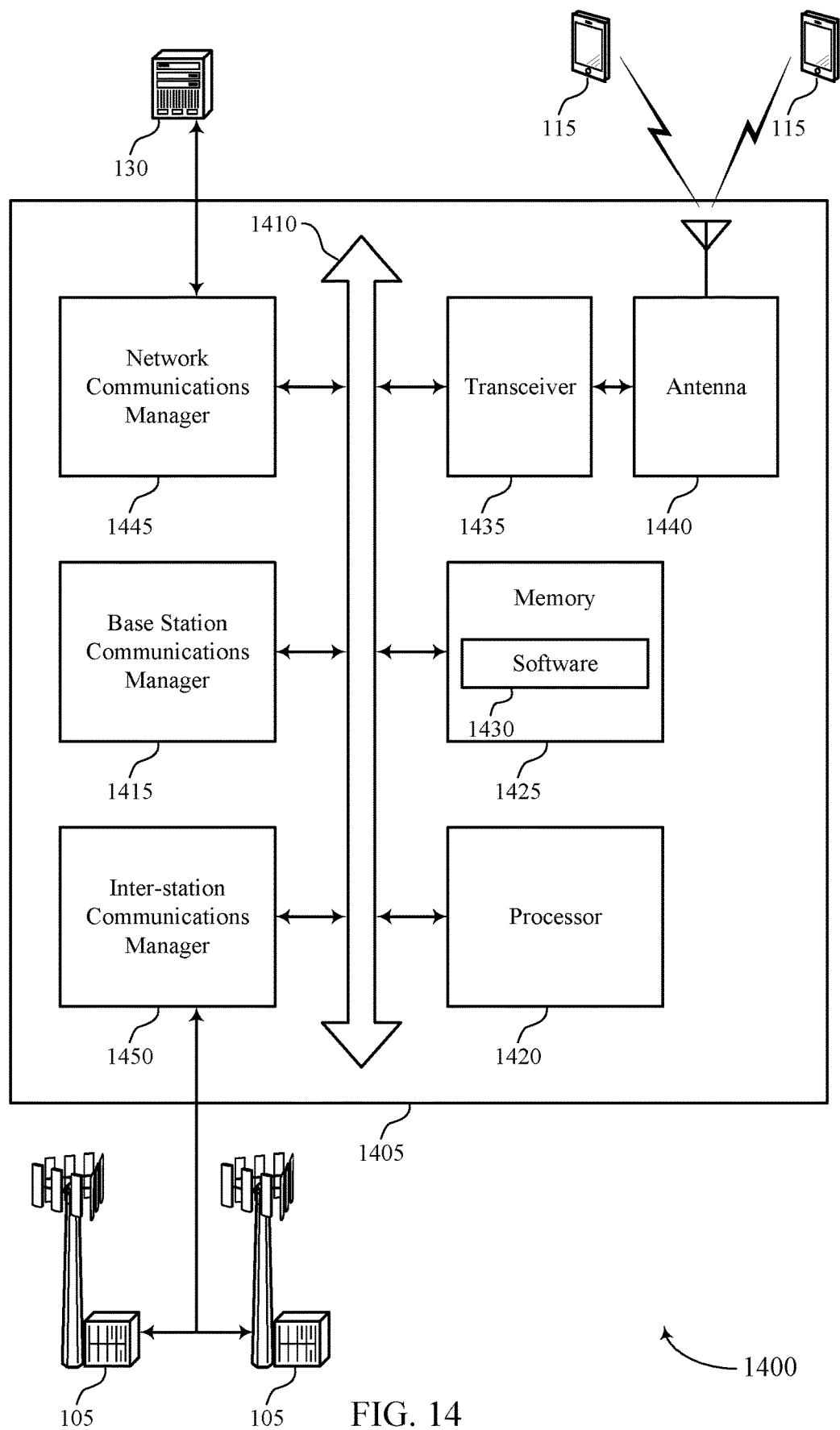
FIG. 14 illustrates a block diagram of a system including a base station that supports transport block size indication for retransmissions in wireless communications in accordance with aspects of the present disclosure.

FIG. 14 shows a diagram of a system 1400 including a device 1405 that supports transport block size indication for retransmissions in wireless communications in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting TBS indication for retransmissions in wireless communications).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support TBS indication for retransmissions in wireless communications. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within a Long Term Evolution (LTE)/LTE-A wireless communication network technology to provide communication between base stations 105.

Figure 15:
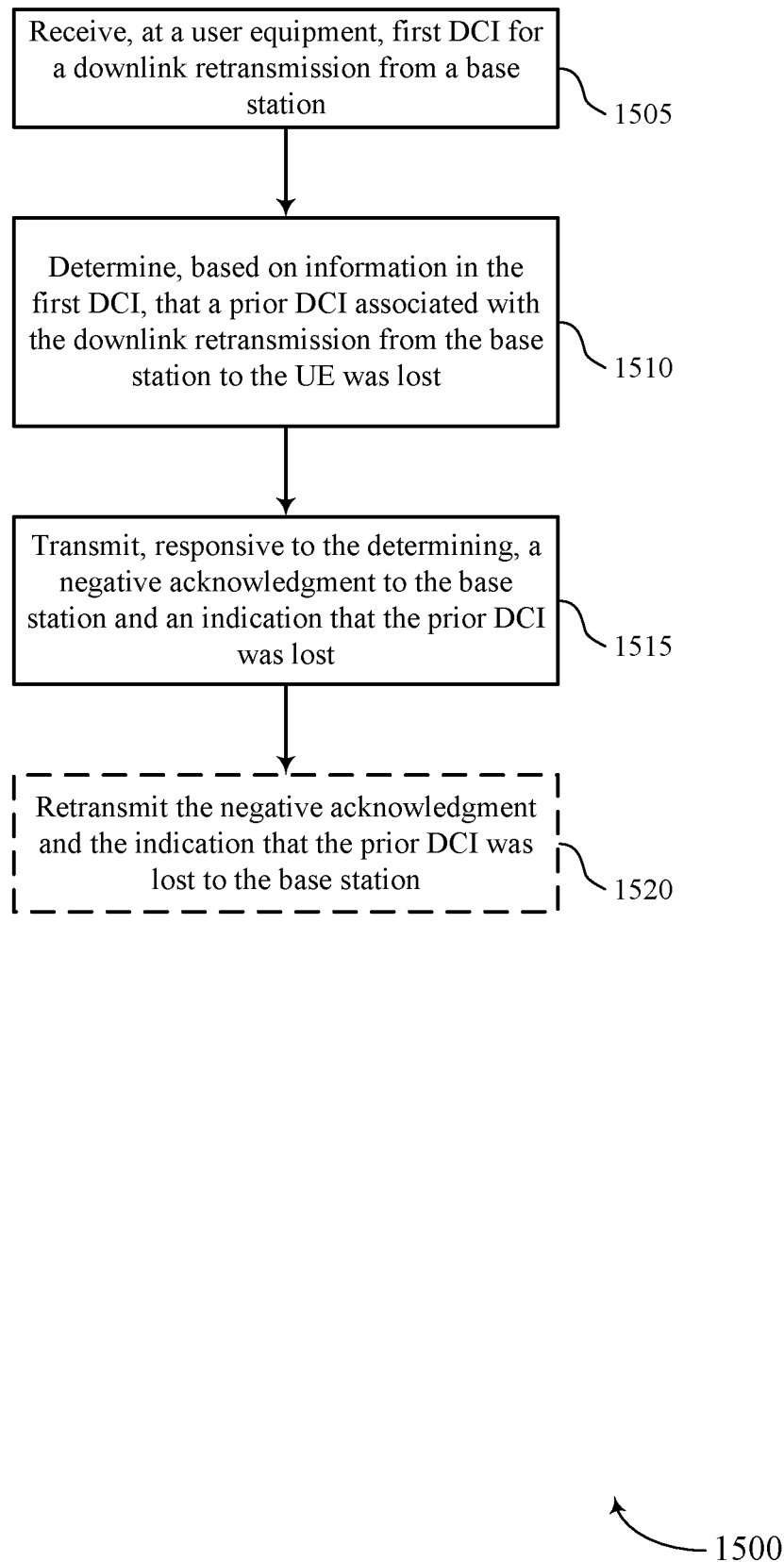
FIGS. 15 through 22 illustrate methods for transport block size indication for retransmissions in wireless communications in accordance with aspects of the present disclosure.

FIG. 15 shows a flowchart illustrating a method 1500 for transport block size indication for retransmissions in wireless communications in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive first DCI for a downlink retransmission from a base station. The operations of 1505 may be performed according to the methods described herein. In certain examples, aspects of the operations of 1505 may be performed by a DCI component as described with reference to FIGS. 7 through 10.

At 1510 the UE 115 may determine, based at least in part on information in the first DCI, that a prior DCI associated with the downlink retransmission from the base station to the UE was lost. The operations of 1510 may be performed according to the methods described herein. In certain examples, aspects of the operations of 1510 may be performed by a TBS component as described with reference to FIGS. 7 through 10.

At 1515 the UE 115 may transmit, responsive to the determining, a negative acknowledgment to the base station and an indication that the prior DCI was lost. The operations of 1515 may be performed according to the methods described herein. In certain examples, aspects of the operations of 1515 may be performed by an acknowledgment feedback component as described with reference to FIGS. 7 through 10.

Optionally, at 1520 the UE 115 may retransmit the negative acknowledgment and the indication that the prior DCI was lost to the base station. The operations of 1520 may be performed according to the methods described herein. In certain examples, aspects of the operations of 1520 may be performed by an acknowledgment feedback component as described with reference to FIGS. 7 through 10.

Figure 16:
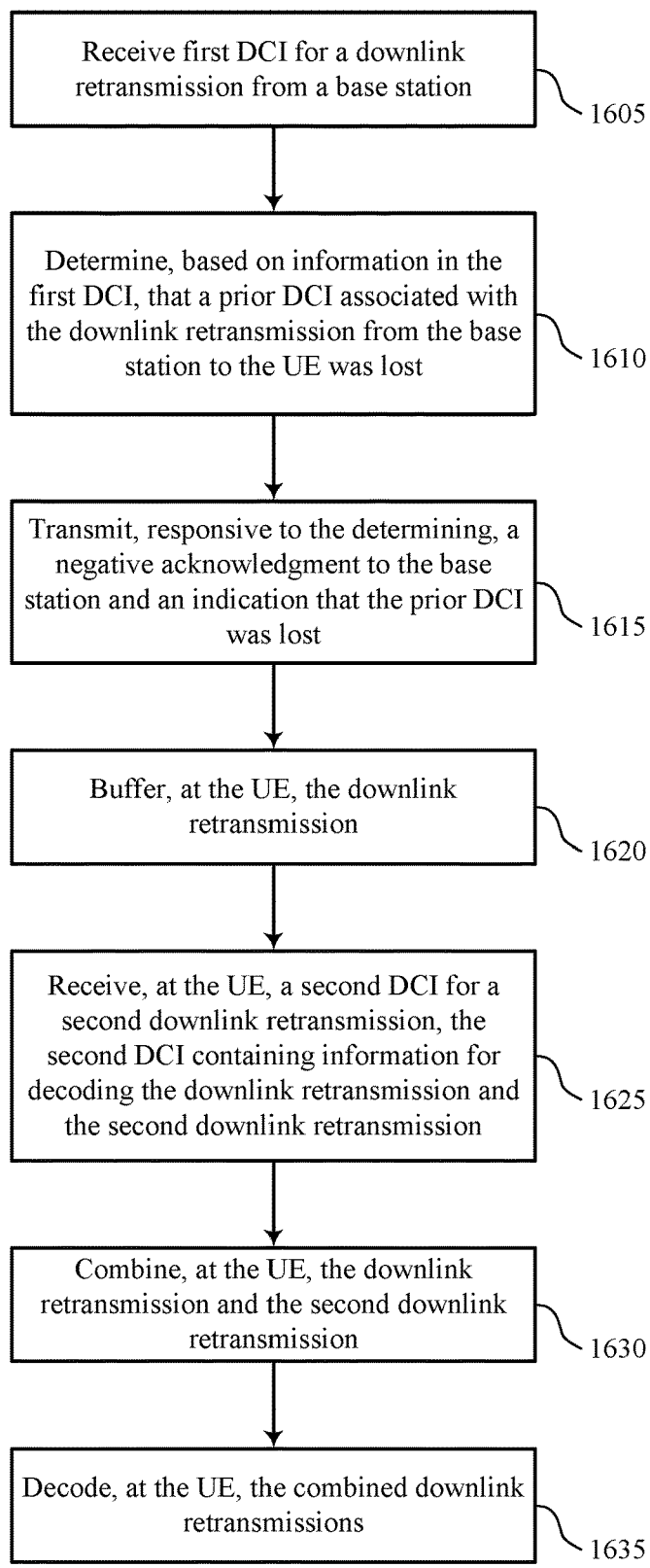

FIG. 16 shows a flowchart illustrating a method 1600 for transport block size indication for retransmissions in wireless communications in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive first DCI for a downlink retransmission from a base station. The operations of 1605 may be performed according to the methods described herein. In certain examples, aspects of the operations of 1605 may be performed by a DCI component as described with reference to FIGS. 7 through 10.

At 1610 the UE 115 may determine, based at least in part on information in the first DCI, that a prior DCI associated with the downlink retransmission from the base station to the UE was lost. The operations of 1610 may be performed according to the methods described herein. In certain examples, aspects of the operations of 1610 may be performed by a TBS component as described with reference to FIGS. 7 through 10.

At 1615 the UE 115 may transmit, responsive to the determining, a negative acknowledgment to the base station and an indication that the prior DCI was lost. The operations of 1615 may be performed according to the methods described herein. In certain examples, aspects of the operations of 1615 may be performed by an acknowledgment feedback component as described with reference to FIGS. 7 through 10.

At 1620 the UE 115 may buffer, the downlink retransmission. The operations of 1620 may be performed according to the methods described herein. In certain examples, aspects of the operations of 1620 may be performed by a soft buffer as described with reference to FIGS. 7 through 10.

At 1625 the UE 115 may receive a second DCI for a second downlink retransmission, the second DCI containing information for decoding the downlink retransmission and the second downlink retransmission. The operations of 1625 may be performed according to the methods described herein. In certain examples, aspects of the operations of 1625 may be performed by a DCI component as described with reference to FIGS. 7 through 10.

At 1630 the UE 115 may combine the downlink retransmission and the second downlink retransmission. The operations of 1630 may be performed according to the methods described herein. In certain examples, aspects of the operations of 1630 may be performed by a soft combining component as described with reference to FIGS. 7 through 10.

At 1635 the UE 115 may decode the combined downlink retransmissions. The operations of 1635 may be performed according to the methods described herein. In certain examples, aspects of the operations of 1635 may be performed by a decoder as described with reference to FIGS. 7 through 10.

Figure 17:
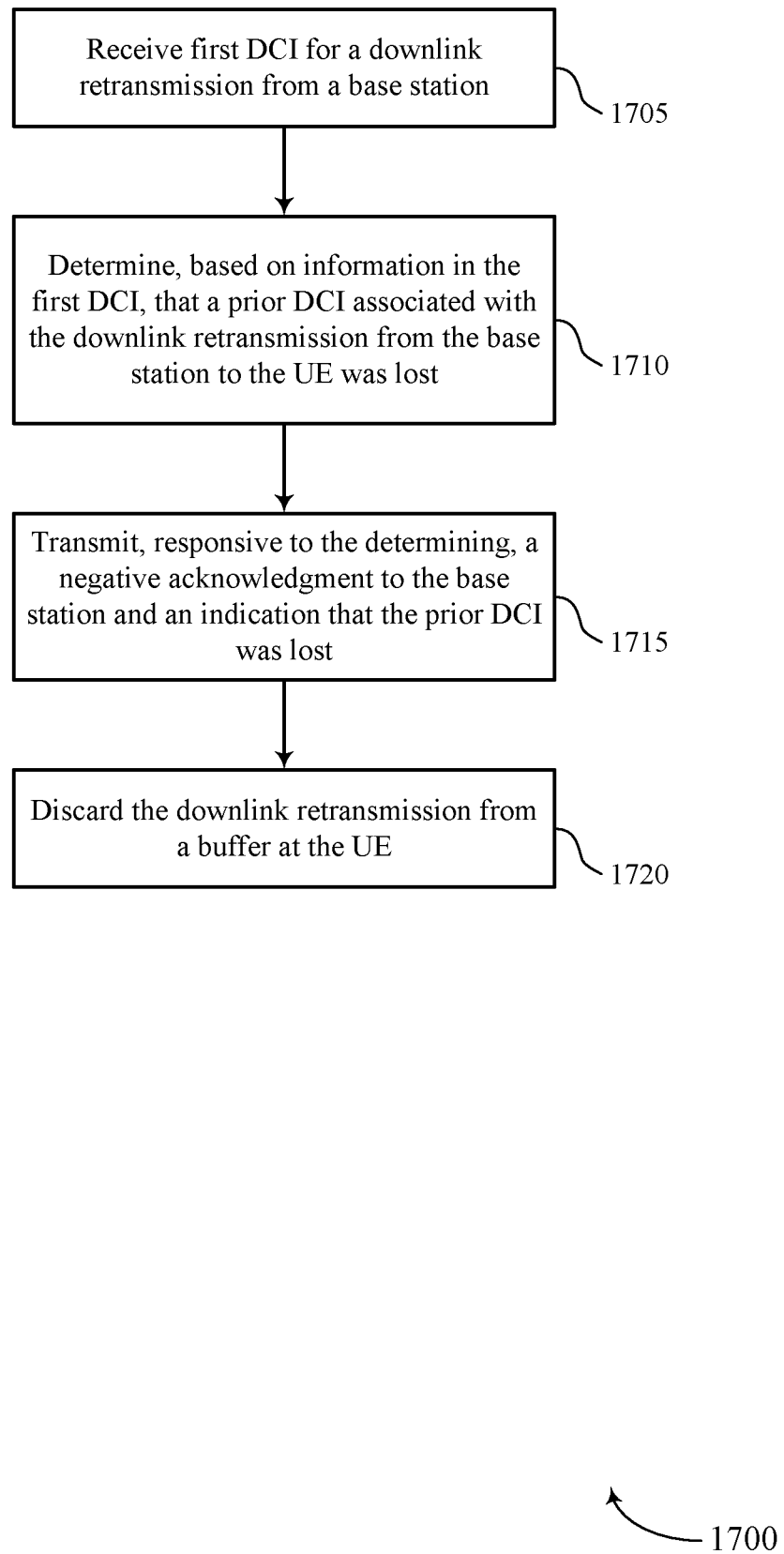

FIG. 17 shows a flowchart illustrating a method 1700 for transport block size indication for retransmissions in wireless communications in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive first DCI for a downlink retransmission from a base station. The operations of 1705 may be performed according to the methods described herein. In certain examples, aspects of the operations of 1705 may be performed by a DCI component as described with reference to FIGS. 7 through 10.

At 1710 the UE 115 may determine, based at least in part on information in the first DCI, that a prior DCI associated with the downlink retransmission from the base station to the UE was lost. The operations of 1710 may be performed according to the methods described herein. In certain examples, aspects of the operations of 1710 may be performed by a TBS component as described with reference to FIGS. 7 through 10.

At 1715 the UE 115 may transmit, responsive to the determining, a negative acknowledgment to the base station and an indication that the prior DCI was lost. The operations of 1715 may be performed according to the methods described herein. In certain examples, aspects of the operations of 1715 may be performed by acknowledgment feedback component as described with reference to FIGS. 7 through 10.

At 1720 the UE 115 may discard the downlink retransmission from a buffer at the UE, based at least in part on determining that a prior DCI associated with the downlink retransmission from the base station to the UE was lost. The operations of 1720 may be performed according to the methods described herein. In certain examples, aspects of the operations of 1720 may be performed by a soft buffer as described with reference to FIGS. 7 through 10.

Figure 18:
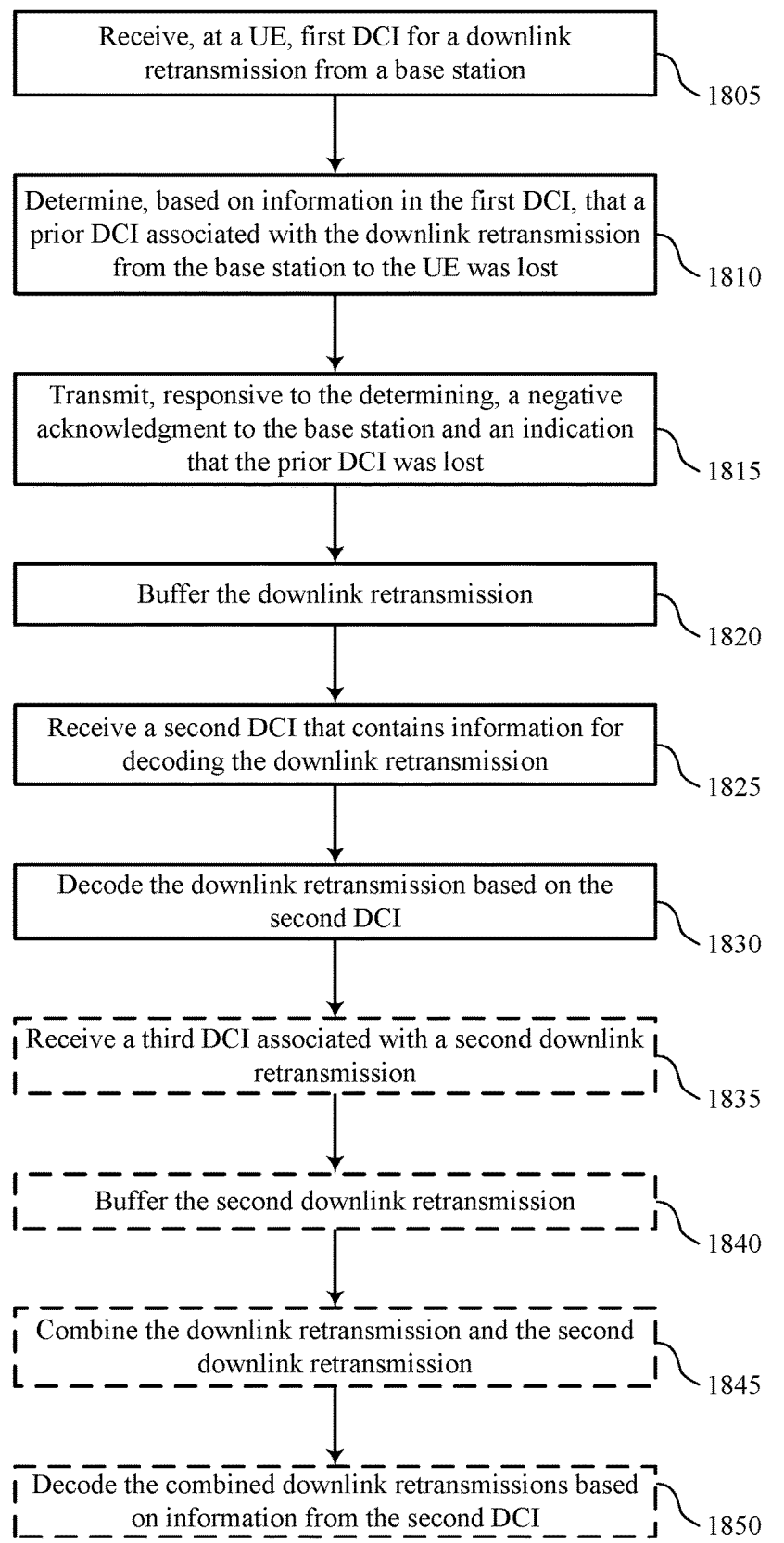

FIG. 18 shows a flowchart illustrating a method 1800 for transport block size indication for retransmissions in wireless communications in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive first DCI for a downlink retransmission from a base station. The operations of 1805 may be performed according to the methods described herein. In certain examples, aspects of the operations of 1805 may be performed by a DCI component as described with reference to FIGS. 7 through 10.

At 1810 the UE 115 may determine, based at least in part on information in the first DCI, that a prior DCI associated with the downlink retransmission from the base station to the UE was lost. The operations of 1810 may be performed according to the methods described herein. In certain examples, aspects of the operations of 1810 may be performed by a TBS component as described with reference to FIGS. 7 through 10.

At 1815 the UE 115 may transmit, responsive to the determining, a negative acknowledgment to the base station and an indication that the prior DCI was lost. The operations of 1815 may be performed according to the methods described herein. In certain examples, aspects of the operations of 1815 may be performed by an acknowledgment feedback component as described with reference to FIGS. 7 through 10.

At 1820 the UE 115 may buffer the downlink retransmission. The operations of 1820 may be performed according to the methods described herein. In certain examples, aspects of the operations of 1820 may be performed by a soft buffer as described with reference to FIGS. 7 through 10.

At 1825 the UE 115 may receive a second DCI that contains information for decoding the downlink retransmission. The operations of 1825 may be performed according to the methods described herein. In certain examples, aspects of the operations of 1825 may be performed by a DCI component as described with reference to FIGS. 7 through 10.

At 1830 the UE 115 may decode the downlink retransmission based at least in part on the second DCI. The operations of 1830 may be performed according to the methods described herein. In certain examples, aspects of the operations of 1830 may be performed by a decoder as described with reference to FIGS. 7 through 10.

In some cases, additionally or alternatively to the operations at 1825 and 1830, the UE may continue, at 1835, may receive a third DCI associated with a second downlink retransmission. The operations of 1835 may be performed according to the methods described herein. In certain examples, aspects of the operations of 1835 may be performed by a DCI component as described with reference to FIGS. 7 through 10.

In such cases, at 1840 the UE 115 may buffer the second downlink retransmission. The operations of 1840 may be performed according to the methods described herein. In certain examples, aspects of the operations of 1840 may be performed by a soft buffer as described with reference to FIGS. 7 through 10. At 1845 the UE 115 may combine the downlink retransmission and the second downlink retransmission. The operations of 1845 may be performed according to the methods described herein. In certain examples, aspects of the operations of 1845 may be performed by a soft combining component as described with reference to FIGS. 7 through 10.

In such cases, at 1850 the UE 115 may decode the combined downlink retransmissions based at least in part on information from the second DCI. The operations of 1850 may be performed according to the methods described herein. In certain examples, aspects of the operations of 1850 may be performed by a decoder as described with reference to FIGS. 7 through 10.

Figure 19:
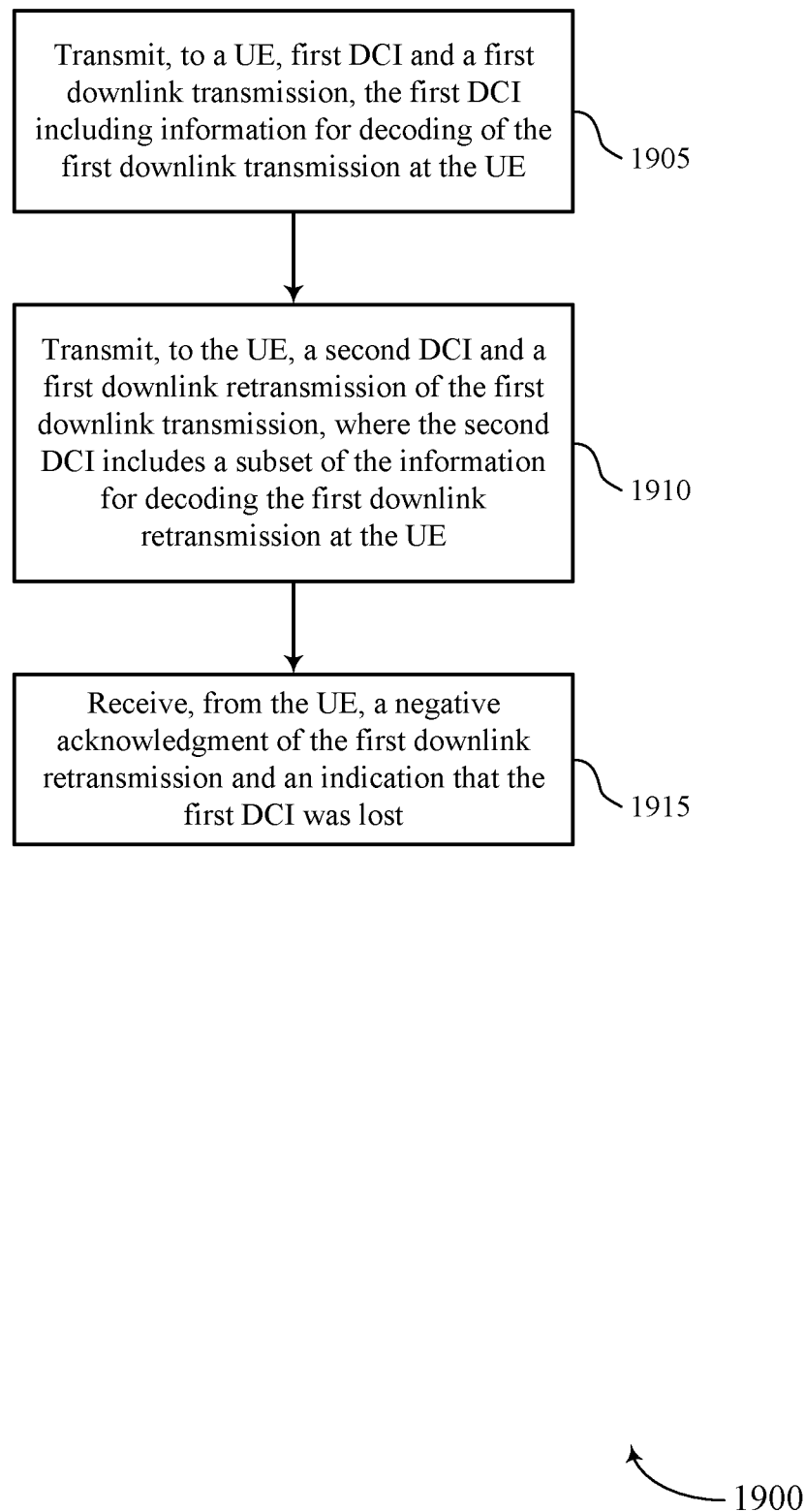

FIG. 19 shows a flowchart illustrating a method 1900 for transport block size indication for retransmissions in wireless communications in accordance with aspects of the present disclosure. The operations of method 1900 may be implemented by a base station 105 or its components as described herein. For example, the operations of method 1900 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1905 the base station 105 may transmit, to a UE, first DCI and a first downlink transmission, the first DCI including information for decoding of the first downlink transmission at the UE. The operations of 1905 may be performed according to the methods described herein. In certain examples, aspects of the operations of 1905 may be performed by a DCI component as described with reference to FIGS. 11 through 14.

At 1910 the base station 105 may transmit, to the UE, a second DCI and a first downlink retransmission of the first downlink transmission, wherein the second DCI includes a subset of the information for decoding the first downlink retransmission at the UE. The operations of 1910 may be performed according to the methods described herein. In certain examples, aspects of the operations of 1910 may be performed by a retransmission component as described with reference to FIGS. 11 through 14.

At 1915 the base station 105 may receive, from the UE, a negative acknowledgment of the first downlink retransmission and an indication that the first DCI was lost. The operations of 1915 may be performed according to the methods described herein. In certain examples, aspects of the operations of 1915 may be performed by an acknowledgment feedback component as described with reference to FIGS. 11 through 14.

Figure 20:
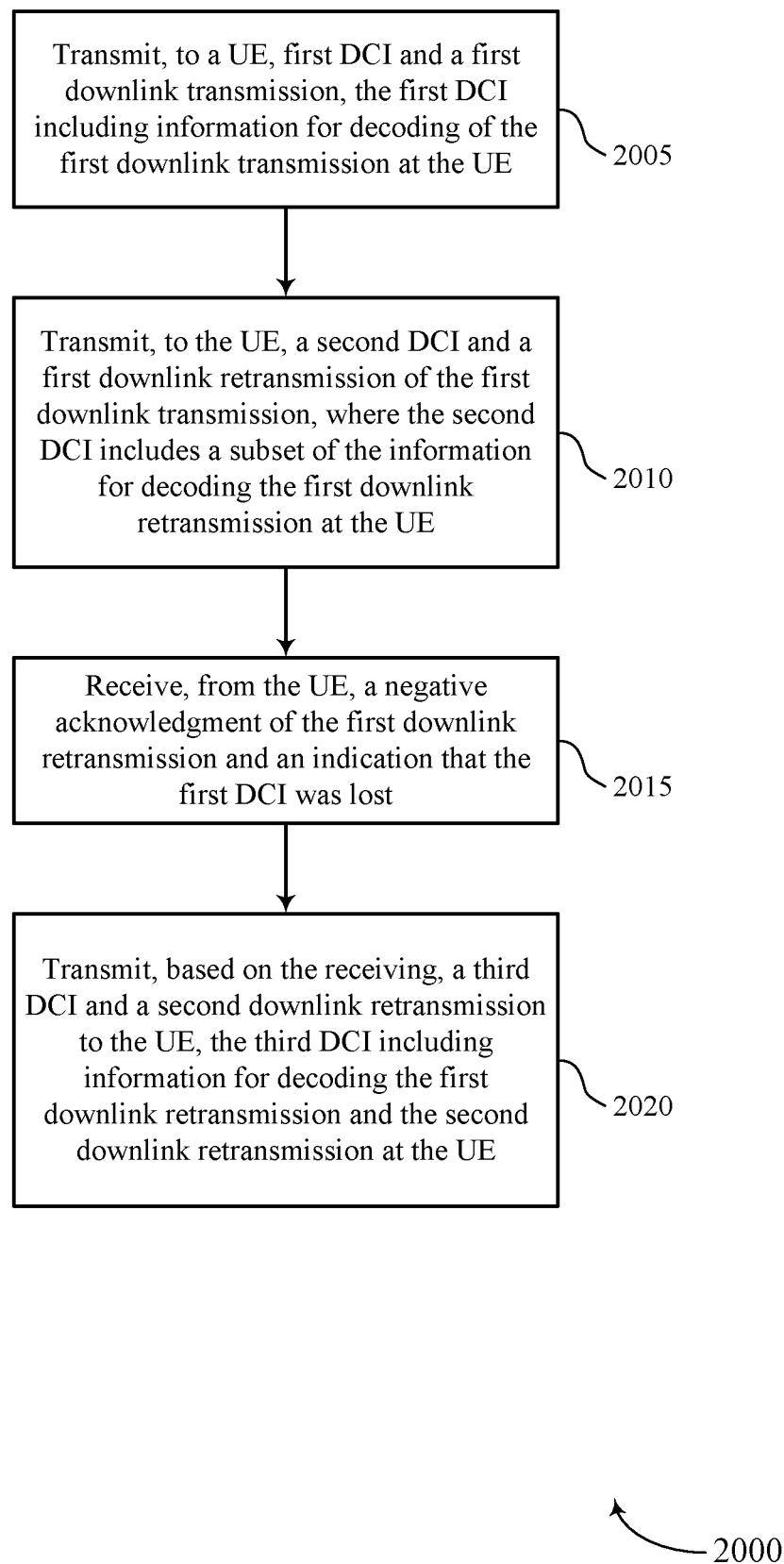

FIG. 20 shows a flowchart illustrating a method 2000 for transport block size indication for retransmissions in wireless communications in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may transmit, to a UE, first DCI and a first downlink transmission, the first DCI including information for decoding of the first downlink transmission at the UE. The operations of 2005 may be performed according to the methods described herein. In certain examples, aspects of the operations of 2005 may be performed by a DCI component as described with reference to FIGS. 11 through 14.

At 2010 the base station 105 may transmit, to the UE, a second DCI and a first downlink retransmission of the first downlink transmission, wherein the second DCI includes a subset of the information for decoding the first downlink retransmission at the UE. The operations of 2010 may be performed according to the methods described herein. In certain examples, aspects of the operations of 2010 may be performed by a retransmission component as described with reference to FIGS. 11 through 14.

At 2015 the base station 105 may receive, from the UE, a negative acknowledgment of the first downlink retransmission and an indication that the first DCI was lost. The operations of 2015 may be performed according to the methods described herein. In certain examples, aspects of the operations of 2015 may be performed by an acknowledgment feedback component as described with reference to FIGS. 11 through 14.

At 2020 the base station 105 may transmit, based at least in part on the receiving, a third DCI and a second downlink retransmission to the UE, the third DCI including information for decoding the first downlink retransmission and the second downlink retransmission at the UE. The operations of 2020 may be performed according to the methods described herein. In certain examples, aspects of the operations of 2020 may be performed by a DCI component as described with reference to FIGS. 11 through 14.

Figure 21:
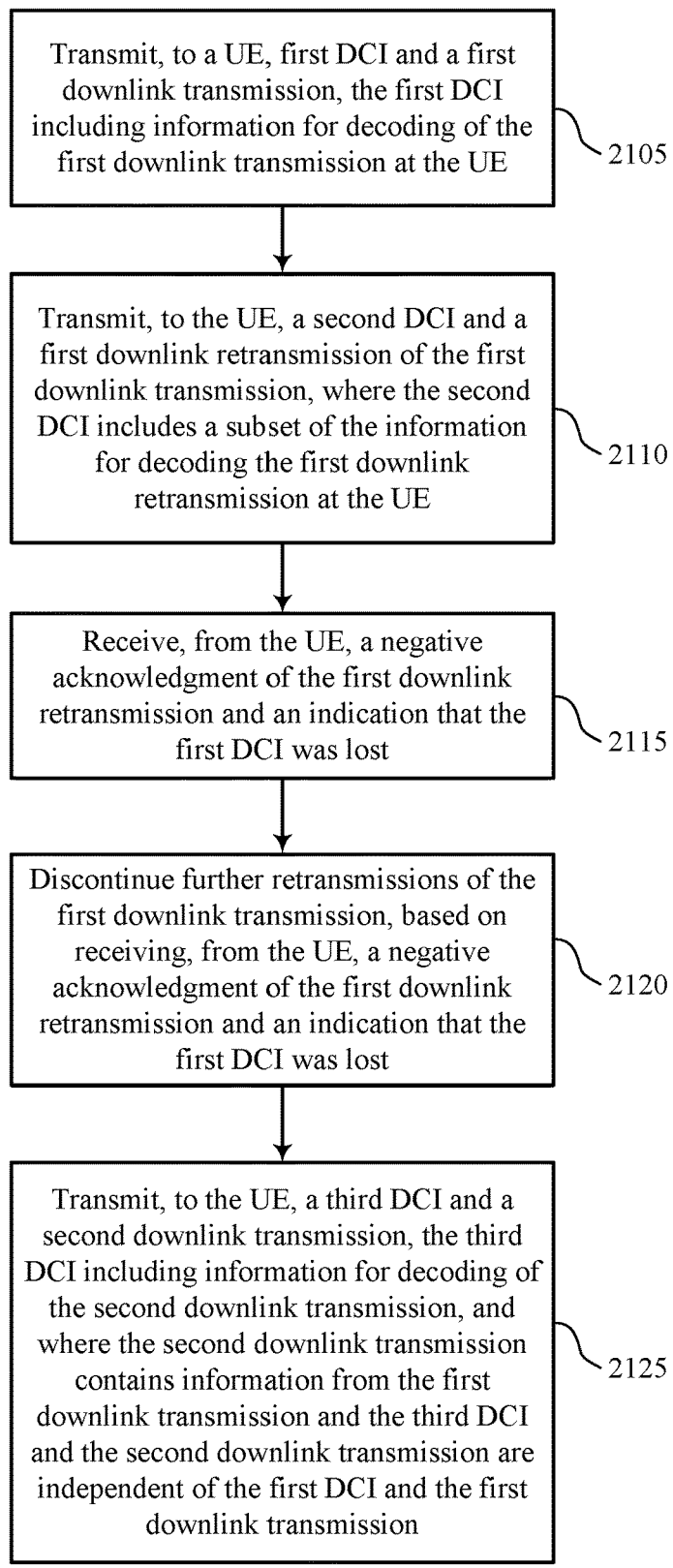

FIG. 21 shows a flowchart illustrating a method 2100 for transport block size indication for retransmissions in wireless communications in accordance with aspects of the present disclosure. The operations of method 2100 may be implemented by a base station 105 or its components as described herein. For example, the operations of method 2100 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2105 the base station 105 may transmit, to a UE, first DCI and a first downlink transmission, the first DCI including information for decoding of the first downlink transmission at the UE. The operations of 2105 may be performed according to the methods described herein. In certain examples, aspects of the operations of 2105 may be performed by a DCI component as described with reference to FIGS. 11 through 14.

At 2110 the base station 105 may transmit, to the UE, a second DCI and a first downlink retransmission of the first downlink transmission, wherein the second DCI includes a subset of the information for decoding the first downlink retransmission at the UE. The operations of 2110 may be performed according to the methods described herein. In certain examples, aspects of the operations of 2110 may be performed by a retransmission component as described with reference to FIGS. 11 through 14.

At 2115 the base station 105 may receive, from the UE, a negative acknowledgment of the first downlink retransmission and an indication that the first DCI was lost. The operations of 2115 may be performed according to the methods described herein. In certain examples, aspects of the operations of 2115 may be performed by an acknowledgment feedback component as described with reference to FIGS. 11 through 14.

At 2120 the base station 105 may discontinue further retransmissions of the first downlink transmission, based at least in part on receiving, from the UE, a negative acknowledgment of the first downlink retransmission and an indication that the first DCI was lost. The operations of 2120 may be performed according to the methods described herein. In certain examples, aspects of the operations of 2120 may be performed by a retransmission component as described with reference to FIGS. 11 through 14.

At 2125 the base station 105 may transmit, to the UE, a third DCI and a second downlink transmission, the third DCI including information for decoding of the second downlink transmission, and wherein the second downlink transmission contains information from the first downlink transmission and the third DCI and the second downlink transmission are independent of the first DCI and the first downlink transmission. The operations of 2125 may be performed according to the methods described herein. In certain examples, aspects of the operations of 2125 may be performed by a retransmission component as described with reference to FIGS. 11 through 14.

Figure 22:
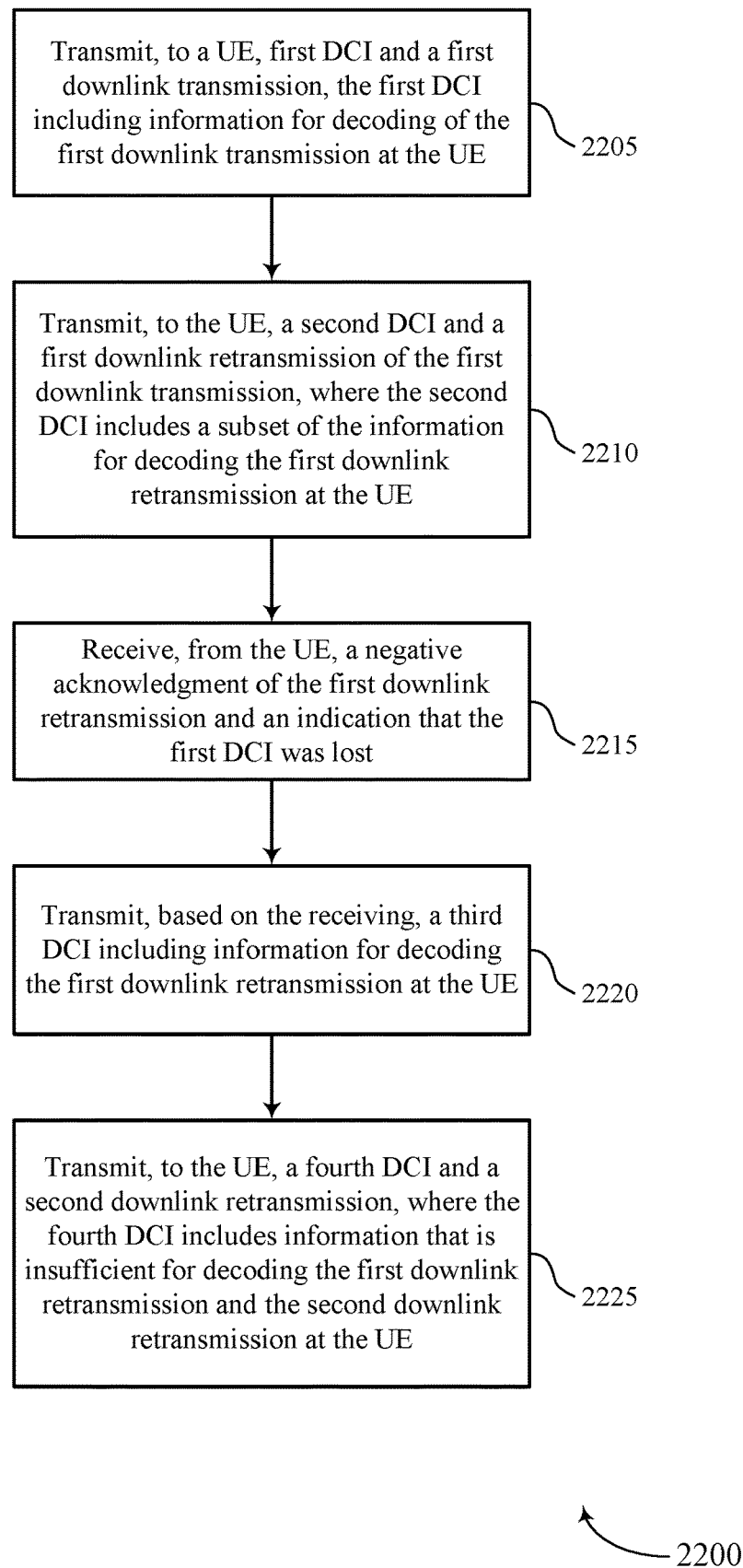

FIG. 22 shows a flowchart illustrating a method 2200 for transport block size indication for retransmissions in wireless communications in accordance with aspects of the present disclosure. The operations of method 2200 may be implemented by a base station 105 or its components as described herein. For example, the operations of method 2200 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 2205 the base station 105 may transmit, to a UE, first DCI and a first downlink transmission, the first DCI including information for decoding of the first downlink transmission at the UE. The operations of 2205 may be performed according to the methods described herein. In certain examples, aspects of the operations of 2205 may be performed by a DCI component as described with reference to FIGS. 11 through 14.

At 2210 the base station 105 may transmit, to the UE, a second DCI and a first downlink retransmission of the first downlink transmission, wherein the second DCI includes a subset of the information for decoding the first downlink retransmission at the UE. The operations of 2210 may be performed according to the methods described herein. In certain examples, aspects of the operations of 2210 may be performed by a retransmission component as described with reference to FIGS. 11 through 14.

At 2215 the base station 105 may receive, from the UE, a negative acknowledgment of the first downlink retransmission and an indication that the first DCI was lost. The operations of 2215 may be performed according to the methods described herein. In certain examples, aspects of the operations of 2215 may be performed by an acknowledgment feedback component as described with reference to FIGS. 11 through 14.

At 2220 the base station 105 may transmit, based at least in part on the receiving, a third DCI including information for decoding the first downlink retransmission at the UE. The operations of 2220 may be performed according to the methods described herein. In certain examples, aspects of the operations of 2220 may be performed by a DCI component as described with reference to FIGS. 11 through 14.

At 2225 the base station 105 may transmit, to the UE, a fourth DCI and a second downlink retransmission, wherein the fourth DCI includes information that is insufficient for decoding the first downlink retransmission and the second downlink retransmission at the UE. The operations of 2225 may be performed according to the methods described herein. In certain examples, aspects of the operations of 2225 may be performed by a retransmission component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, at a user equipment (UE), first downlink control information (DCI) for a downlink retransmission from a base station;
   determining, based at least in part on information in the first DCI, that a prior DCI associated with the downlink retransmission from the base station to the UE was lost; and
   transmitting, responsive to the determining, a negative acknowledgment to the base station and an indication that the prior DCI was lost.

2. The method of claim 1, wherein the transmitting comprises transmitting the negative acknowledgment and the indication that the prior DCI was lost in uplink control information (UCI) transmitted to the base station.

3. The method of claim 2, wherein the UCI is transmitted to the base station via a physical uplink control channel (PUCCH) transmission.

4. The method of claim 1, wherein the determining comprises determining that a transport block size (TBS) of the downlink retransmission is unable to be derived from the first DCI.

5. The method of claim 1, wherein the determining is based at least in part on one or more of a new data indicator (NDI), an acknowledgment feedback process number, and a modulation and coding scheme (MCS) for the downlink retransmission in the first DCI.

6. The method of claim 1, further comprising:
   retransmitting the negative acknowledgment and the indication that the prior DCI was lost to the base station, wherein the indication that the prior DCI was lost is based at least in part on the first DCI comprising a first new data indicator that is toggled.

7. The method of claim 1, further comprising:
   buffering, at the UE, the downlink retransmission;
   receiving, at the UE, a second DCI for a second downlink retransmission, the second DCI containing information for decoding the downlink retransmission and the second downlink retransmission;
combining, at the UE, the downlink retransmission and the second downlink retransmission; and
decoding, at the UE, the combined downlink retransmissions.

8. The method of claim 1, further comprising:
discarding the downlink retransmission from a buffer at the UE, based at least in part on determining that the prior DCI associated with the downlink retransmission from the base station to the UE was lost.

9. The method of claim 1, further comprising:
buffering the downlink retransmission;
receiving a second DCI that contains information for decoding the downlink retransmission; and
decoding the downlink retransmission based at least in part on the second DCI.

10. The method of claim 9, further comprising:
receiving a third DCI associated with a second downlink retransmission;
buffering the second downlink retransmission;
combining the downlink retransmission and the second downlink retransmission; and
decoding the combined downlink retransmissions based at least in part on information from the second DCI.

11. A method for wireless communication, comprising:
transmitting, to a user equipment (UE), first downlink control information (DCI) and a first downlink transmission, the first DCI including information for decoding of the first downlink transmission at the UE;
transmitting, to the UE, a second DCI and a first downlink retransmission of the first downlink transmission, wherein the second DCI includes a subset of the information for decoding the first downlink retransmission at the UE; and
receiving, from the UE, a negative acknowledgment of the first downlink retransmission and an indication that the first DCI was lost.

12. The method of claim 11, wherein the negative acknowledgment and the indication that the first DCI was lost is received in uplink control information (UCI).

13. The method of claim 12, wherein the UCI is received at via a physical uplink control channel (PUCCH) transmission.

14. The method of claim 11, further comprising:
transmitting, based at least in part on the receiving, a third DCI and a second downlink retransmission to the UE, the third DCI including information for decoding the first downlink retransmission and the second downlink retransmission at the UE.

15. The method of claim 11, further comprising:
discontinuing further retransmissions of the first downlink transmission, based at least in part on receiving, from the UE, the negative acknowledgment of the first downlink retransmission and the indication that the first DCI was lost.

16. The method of claim 15, further comprising:
transmitting, to the UE, a third DCI and a second downlink transmission, the third DCI including information for decoding of the second downlink transmission, and wherein the second downlink transmission contains information from the first downlink transmission and the third DCI and the second downlink transmission are independent of the first DCI and the first downlink transmission.

17. The method of claim 11, further comprising:
transmitting, based at least in part on the receiving, a third DCI including information for decoding the first downlink retransmission at the UE.

18. The method of claim 17, further comprising:
transmitting, to the UE, a fourth DCI and a second downlink retransmission.

19. The method of claim 18, wherein the fourth DCI includes information that is insufficient for decoding the first downlink retransmission and the second downlink retransmission at the UE.

20. An apparatus for wireless communication, comprising:
a processor;
memory in electronic communication with the processor; and
instructions stored in the memory and executable by the processor to cause the apparatus to:
receive, at a user equipment (UE), first downlink control information (DCI) for a downlink retransmission from a base station;
determine, based at least in part on information in the first DCI, that a prior DCI associated with the downlink retransmission from the base station to the UE was lost; and
transmit, responsive to the determining, a negative acknowledgment to the base station and an indication that the prior DCI was lost.

21. The apparatus of claim 20, wherein the instructions to transmit are further executable by the processor to cause the apparatus to:
transmit the negative acknowledgment and the indication that the prior DCI was lost in uplink control information (UCI) transmitted to the base station.

22. The apparatus of claim 21, wherein the UCI is transmitted to the base station via a physical uplink control channel (PUCCH) transmission.

23. The apparatus of claim 20, wherein the instructions are further executable by the processor to cause the apparatus to determine that a transport block size (TBS) of the downlink retransmission is unable to be derived from the first DCI.

24. The apparatus of claim 20, wherein the instructions are further executable by the processor to cause the apparatus to:
buffer, at the UE, the downlink retransmission;
receive, at the UE, a second DCI for a second downlink retransmission, the second DCI containing information for decoding the downlink retransmission and the second downlink retransmission;
combine, at the UE, the downlink retransmission and the second downlink retransmission; and
decode, at the UE, the combined downlink retransmissions.

25. The apparatus of claim 20, wherein the instructions are further executable by the processor to cause the apparatus to:
discard the downlink retransmission from a buffer at the UE, based at least in part on determining that the prior DCI associated with the downlink retransmission from the base station to the UE was lost.

26. An apparatus for wireless communication, comprising:
a processor;
memory in electronic communication with the processor; and
instructions stored in the memory and executable by the processor to cause the apparatus to:

transmit, to a user equipment (UE), first downlink control information (DCI) and a first downlink transmission, the first DCI including information for decoding of the first downlink transmission at the UE;

transmit, to the UE, a second DCI and a first downlink retransmission of the first downlink transmission, wherein the second DCI includes a subset of the information for decoding the first downlink retransmission at the UE; and receive, from the UE, a negative acknowledgment of the first downlink retransmission and an indication that the first DCI was lost.

27. The apparatus of claim 26, wherein the negative acknowledgment and the indication that the first DCI was lost is received in uplink control information (UCI).

28. The apparatus of claim 27, wherein the UCI is received via a physical uplink control channel (PUCCH) transmission.

29. The apparatus of claim 26, wherein the instructions are further executable by the processor to cause the apparatus to:

transmit, based at least in part on the receiving, a third DCI and a second downlink retransmission to the UE, the third DCI including information for decoding the first downlink retransmission and the second downlink retransmission at the UE.

30. The apparatus of claim 26, wherein the instructions are further executable by the processor to cause the apparatus to:

discontinue further retransmissions of the first downlink transmission, based at least in part on receiving, from the UE, the negative acknowledgment of the first downlink retransmission and the indication that the first DCI was lost.

* * * * *